United States Patent
Sasaki

(10) Patent No.: US 12,438,852 B2
(45) Date of Patent: Oct. 7, 2025

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: BROTHER KOGYO KABUSHIKI KAISHA, Nagoya (JP)

(72) Inventor: Hiroyuki Sasaki, Chita (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 173 days.

(21) Appl. No.: 18/511,997

(22) Filed: Nov. 16, 2023

(65) Prior Publication Data

US 2024/0179136 A1  May 30, 2024

(30) Foreign Application Priority Data

Nov. 25, 2022 (JP) .................................. 2022-188113

(51) Int. Cl.
*H04L 9/40* (2022.01)
*H04L 9/16* (2006.01)

(52) U.S. Cl.
CPC .......... *H04L 63/0428* (2013.01); *H04L 9/16* (2013.01); *H04L 63/166* (2013.01)

(58) Field of Classification Search
CPC ..... H04L 9/16; H04L 63/166; H04L 63/0428; H04L 63/205
USPC .......................................................... 713/151
See application file for complete search history.

(56) References Cited

U.S. PATENT DOCUMENTS

| 8,787,572 B1* | 7/2014 | Tewari ................. H04L 9/3226 380/255 |
| 10,044,683 B2* | 8/2018 | Nakano ................. H04L 63/061 |
| 10,721,075 B2* | 7/2020 | Campagna .......... G06F 12/1408 |
| 11,626,996 B2* | 4/2023 | Campagna ............ H04L 9/0822 713/168 |
| 11,882,100 B2* | 1/2024 | Hatanaka ............ H04L 63/0428 |
| 2007/0162748 A1* | 7/2007 | Okayama ............ H04L 63/0428 713/165 |
| 2021/0400028 A1* | 12/2021 | Iwasaki ............... H04L 63/0869 |

(Continued)

FOREIGN PATENT DOCUMENTS

JP  2021-93638 A  6/2021

OTHER PUBLICATIONS

RFC8446; The Transport Layer Security (TLS) Protocol Version 1.3; Internet Engineering Task Force (IETF); Aug. 2018.

*Primary Examiner* — Amare F Tabor
(74) *Attorney, Agent, or Firm* — KENEALY VAIDYA LLP

(57) ABSTRACT

In a case where a first communication device obtains a first setting request not including first version information indicating a first version of an encrypted communication protocol but including second version information indicating a second version of the encrypted communication protocol, the first communication device may send first setting information to a second communication device, the first setting information including the second version information and second scheme information indicating a second encryption scheme but not including first scheme information indicating a first encryption scheme which is less secure than the second encryption scheme.

12 Claims, 12 Drawing Sheets

(56) References Cited

U.S. PATENT DOCUMENTS

2023/0292115 A1* 9/2023 Mavureddi Dhanasekaran .......... H04L 63/0414

* cited by examiner

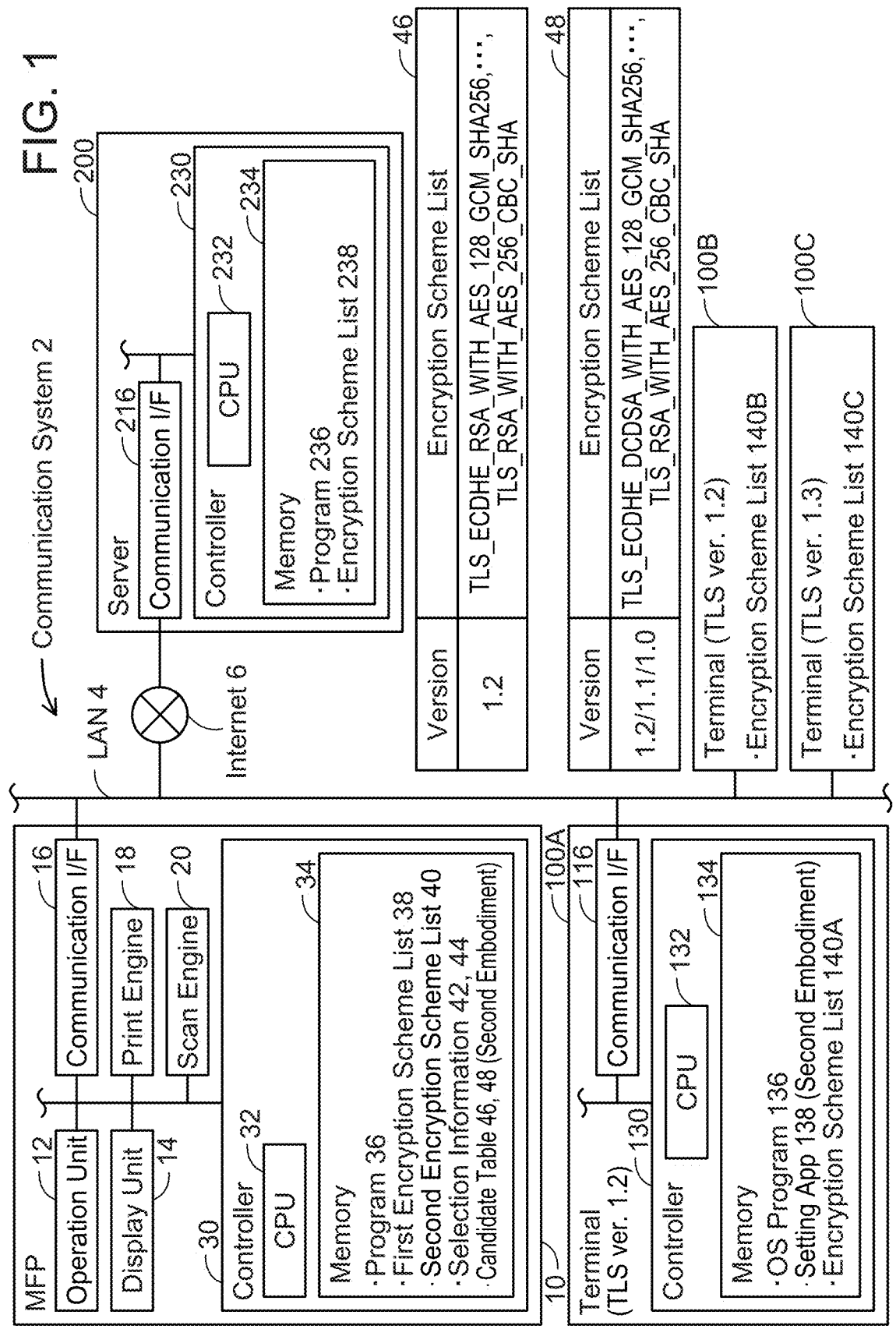

FIG. 2

| | 1.3 | 1.3<br>1.2 | 1.3<br>1.2<br>1.1<br>1.0 | 1.2 | 1.2<br>1.1<br>1.0 | 1.1<br>1.0 |
|---|---|---|---|---|---|---|
| TLS_AES_128_GCM_SHA256 | O | O | O | | | |
| TLS_AES_256_GCM_SHA384 | O | O | O | | | |
| TLS_CHACHA20_POLY1305_SHA256 | O | O | O | | | |
| TLS_ECDHE_ECDSA_WITH_AES_128_GCM_SHA256 | | O | O | O | O | |
| TLS_ECDHE_RSA_WITH_AES_128_GCM_SHA256 | | O | O | O | O | |
| TLS_ECDHE_ECDSA_WITH_AES_256_GCM_SHA384 | | O | O | O | O | |
| TLS_ECDHE_RSA_WITH_AES_256_GCM_SHA384 | | O | O | O | O | |
| TLS_ECDHE_ECDSA_WITH_CHACHA20_POLY1305_SHA256 | | O | O | O | O | |
| TLS_ECDHE_RSA_WITH_CHACHA20_POLY1305_SHA256 | | O | O | O | O | |
| TLS_DHE_RSA_WITH_AES_128_GCM_SHA256 | | O | O | O | O | |
| TLS_DHE_RSA_WITH_AES_256_GCM_SHA384 | | O | O | O | O | |
| TLS_DHE_RSA_WITH_CHACHA20_POLY1305_SHA256 | | O | O | O | O | |
| TLS_RSA_WITH_AES_128_GCM_SHA256 | | O | O | O | O | |
| TLS_RSA_WITH_AES_256_GCM_SHA384 | | O | O | O | O | |
| TLS_ECDHE_ECDSA_WITH_AES_128_CBC_SHA256 | | O | O | O | O | |
| TLS_ECDHE_RSA_WITH_AES_128_CBC_SHA256 | | O | O | O | O | |
| TLS_ECDHE_ECDSA_WITH_AES_128_CBC_SHA | | O | O | O | O | O |
| TLS_ECDHE_ECDSA_WITH_AES_256_CBC_SHA | | O | O | O | O | O |
| TLS_ECDHE_RSA_WITH_AES_128_CBC_SHA | | O | O | O | O | O |
| TLS_ECDHE_RSA_WITH_AES_256_CBC_SHA | | O | O | O | O | O |
| TLS_DHE_RSA_WITH_AES_128_CBC_SHA256 | | O | O | O | O | |
| TLS_DHE_RSA_WITH_AES_256_CBC_SHA256 | | O | O | O | O | |
| TLS_DHE_RSA_WITH_AES_128_CBC_SHA | | O | O | O | O | O |
| TLS_DHE_RSA_WITH_AES_256_CBC_SHA | | O | O | O | O | O |
| TLS_RSA_WITH_AES_128_CBC_SHA256 | | O | O | O | O | |
| TLS_RSA_WITH_AES_256_CBC_SHA256 | | O | O | O | O | |
| TLS_RSA_WITH_AES_128_CBC_SHA | | O | O | O | O | O |
| TLS_RSA_WITH_AES_256_CBC_SHA | | O | O | O | O | O |

FIG. 3

| | 1.3 | 1.3<br>1.2 | 1.3<br>1.2<br>1.1<br>1.0 | 1.2 | 1.2<br>1.1<br>1.0 | 1.1<br>1.0 |
|---|---|---|---|---|---|---|
| TLS_AES_128_GCM_SHA256 | ○ | ○ | ○ | | | |
| TLS_AES_256_GCM_SHA384 | ○ | ○ | ○ | | | |
| TLS_CHACHA20_POLY1305_SHA256 | ○ | ○ | ○ | | | |
| TLS_ECDHE_ECDSA_WITH_AES_128_GCM_SHA256 | | ○ | ○ | ○ | ○ | |
| TLS_ECDHE_RSA_WITH_AES_128_GCM_SHA256 | | ○ | ○ | ○ | ○ | |
| TLS_ECDHE_ECDSA_WITH_AES_256_GCM_SHA384 | | ○ | ○ | ○ | ○ | |
| TLS_ECDHE_RSA_WITH_AES_256_GCM_SHA384 | | ○ | ○ | ○ | ○ | |
| TLS_ECDHE_ECDSA_WITH_CHACHA20_POLY1305_SHA256 | | ○ | ○ | ○ | ○ | |
| TLS_ECDHE_RSA_WITH_CHACHA20_POLY1305_SHA256 | | ○ | ○ | ○ | ○ | |
| TLS_DHE_RSA_WITH_AES_128_GCM_SHA256 | | | ○ | | ○ | |
| TLS_DHE_RSA_WITH_AES_256_GCM_SHA384 | | | ○ | | ○ | |
| TLS_DHE_RSA_WITH_CHACHA20_POLY1305_SHA256 | | | ○ | | ○ | |
| TLS_RSA_WITH_AES_128_GCM_SHA256 | | | ○ | | ○ | |
| TLS_RSA_WITH_AES_256_GCM_SHA384 | | | ○ | | ○ | |
| TLS_ECDHE_ECDSA_WITH_AES_128_CBC_SHA256 | | | ○ | | ○ | |
| TLS_ECDHE_RSA_WITH_AES_128_CBC_SHA256 | | | ○ | | ○ | |
| TLS_ECDHE_ECDSA_WITH_AES_128_CBC_SHA | | | ○ | | ○ | ○ |
| TLS_ECDHE_ECDSA_WITH_AES_256_CBC_SHA | | | ○ | | ○ | ○ |
| TLS_ECDHE_RSA_WITH_AES_128_CBC_SHA | | | ○ | | ○ | ○ |
| TLS_ECDHE_RSA_WITH_AES_256_CBC_SHA | | | ○ | | ○ | ○ |
| TLS_DHE_RSA_WITH_AES_128_CBC_SHA256 | | | ○ | | ○ | |
| TLS_DHE_RSA_WITH_AES_256_CBC_SHA256 | | | ○ | | ○ | |
| TLS_DHE_RSA_WITH_AES_128_CBC_SHA | | | ○ | | ○ | ○ |
| TLS_DHE_RSA_WITH_AES_256_CBC_SHA | | | ○ | | ○ | ○ |
| TLS_RSA_WITH_AES_128_CBC_SHA256 | | | ○ | | ○ | |
| TLS_RSA_WITH_AES_256_CBC_SHA256 | | | ○ | | ○ | |
| TLS_RSA_WITH_AES_128_CBC_SHA | | | ○ | | ○ | ○ |
| TLS_RSA_WITH_AES_256_CBC_SHA | | | ○ | | ○ | ○ |

FIG. 4

```
                                                    ┌─ 140A
  ·TLS_ECDHE_ECDSA_WITH_AES_128_GCM_SHA256
                      ...
       ·TLS_RSA_WITH_AES_128_CBC_SHA

┌─ 140B
   ·TLS_DHE_RSA_WITH_AES_128_GCM_SHA256
                      ...
       ·TLS_RSA_WITH_AES_256_CBC_SHA

┌─ 140C
              ·TLS_AES_GCM_SHA256
              ·TLS_AES_GCM_SHA384
         ·TLS_CHACHA20_POLY1305_SHA256
```

(First Embodiment)

FIG. 6
(Case A: Client "1.2" Selected)
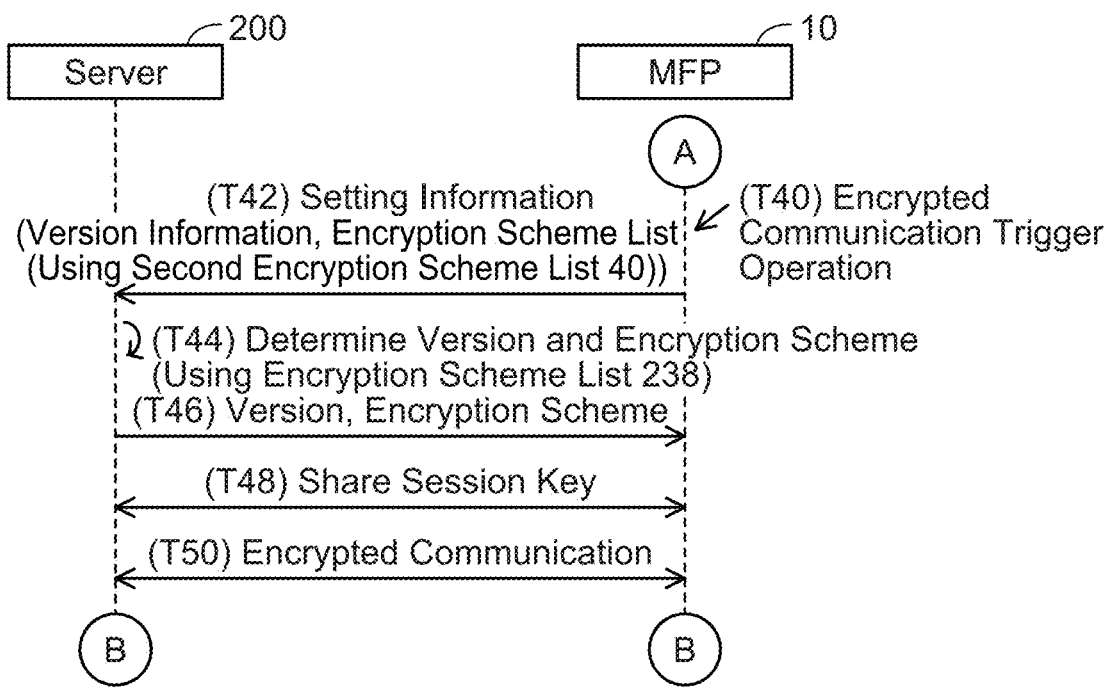
(Case B: Client "1.2/1.1/1.0" Selected)
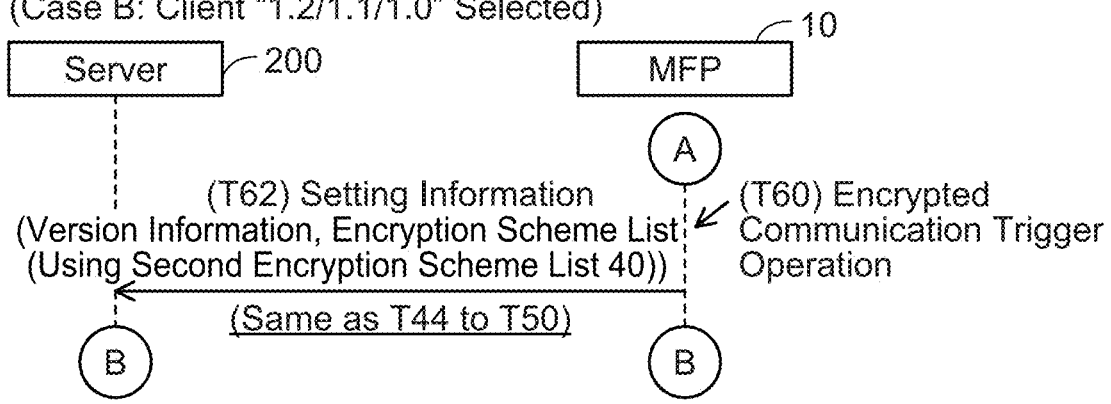
(Case C: Client "1.3/1.2" Selected)
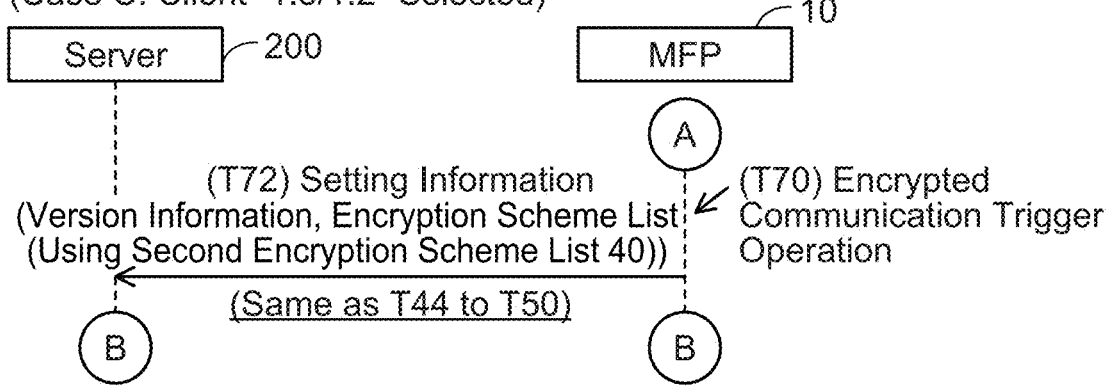

(Case E: Server "1.2/1.1/1.0" Selected)

(Case A: Client "1.2" Selected)

COMMUNICATION DEVICE AND NON-TRANSITORY COMPUTER-READABLE RECORDING MEDIUM STORING COMPUTER-READABLE INSTRUCTIONS FOR COMMUNICATION DEVICE

REFERENCE TO RELATED APPLICATION

This application claims priority from Japanese Patent Application No. 2022-188113 filed on Nov. 25, 2022. The entire content of the priority application is incorporated herein by reference.

BACKGROUND ART

Transport Layer Security (TLS) is known as an encrypted communication protocol for secure communication over a network. TLS includes TLS Version 1.3.

DESCRIPTION

The description herein provides a technology that can enable secure communication.

A first communication device is disclosed herein. The first communication device may support a first version of an encrypted communication protocol and a second version of the encrypted communication protocol, the second version being newer than the first version, the first version may be capable of using a first encryption scheme, the second version may be capable of using the first encryption scheme and a second encryption scheme which is more secure than the first encryption scheme, the first communication device may include a controller, and the controller may be configured to: obtain a setting request related to the encrypted communication protocol; after the setting request has been obtained, send setting information according to the setting request to a second communication device; and after the setting information has been sent to the second communication device, execute an encrypted communication with the second communication device by using a version and an encryption scheme that were determined by the second communication device based on the setting information, wherein in a case where a first setting request not including first version information indicating the first version but including second version information indicating the second version is obtained, the controller may be configured to send first setting information to the second communication device, the first setting information including the second version information and second scheme information indicating the second encryption scheme but not including first scheme information indicating the first encryption scheme, and in a case where a second setting request including the first version information and the second version information is obtained, the controller may be configured to send second setting information to the second communication device, the second setting information including the first version information, the second version information, the first scheme information, and the second scheme information.

According to the above configuration, in the case where the first communication device obtains the first setting request not including the first version information but including the second version information, it sends, to the second communication device, the first setting information including the second version information and the second scheme information but not including the first scheme information. As such, the second communication device can be caused to select using the second encryption scheme which is more secure than the first encryption scheme. As a result, secure communication can be realized between the first communication device and the second communication device.

Another first communication device is disclosed herein. The first communication device may support a first version of an encrypted communication protocol and a second version of the encrypted communication protocol, the second version being newer than the first version, the first version may be capable of using a first encryption scheme, the second version may be capable of using the first encryption scheme and a second encryption scheme which is more secure than the first encryption scheme, the first communication device may include a controller, and the controller may be configured to: obtain a setting request related to the encrypted communication protocol; after the setting request has been obtained, receive candidate information from a second communication device, the candidate information including version information indicating a version of the encrypted communication protocol which the second communication device is capable of using and scheme information indicating an encryption scheme which the second communication device is capable of using; determine a target version and a target encryption scheme, the target version being a version of the encrypted communication protocol to be used in the encrypted communication with the second communication device, and the target encryption scheme being an encryption scheme to be used in the encrypted communication with the second communication device; and execute the encrypted communication with the second communication device by using the target version and the target encryption scheme, wherein in a case where a first setting request not including first version information indicating the first version but including second version information indicating the second version is obtained and first candidate information including the second version information and second scheme information indicating the second encryption scheme is received from the second communication device, the controller may be configured to determine the second version as the target version and determine the second encryption scheme as the target encryption scheme, in a case where the first setting request is obtained and second candidate information including the second version information and first scheme information indicating the first encryption scheme but not including the second scheme information is received from the second communication device, the first encryption scheme may not be determined as the target encryption scheme, in a case where a second setting request including the first version information and the second version information is obtained and the first candidate information is received from the second communication device, the controller may be configured to determine the second version as the target version and determine the second encryption scheme as the target encryption scheme, and in a case where the second setting request is obtained and the second candidate information is received from the second communication device, the controller may be configured to determine the second version as the target version and determine the first encryption scheme as the target encryption scheme.

According to the above configuration, in the case where the first communication device obtains the first setting request not including the first version information but including the second version information and receives the second candidate information including the second version information and the first scheme information but not including the second scheme information from the second communication device, it does not determine the first encryption scheme as the target encryption scheme. Thus, execution of encrypted communication using the first encryption scheme which is less secure than the second encryption scheme between the first communication device and the second communication device can be suppressed. Due to this, secure communication can be realized between the first communication device and the second communication device.

Computer program for the first communication device, a non-transitory computer-readable recording medium storing computer-readable instructions for the first communication device, and a method performed by the first communication device are also novel and useful.

FIG. 1 is a configurational diagram of a communication system.

FIG. 2 is a first encryption scheme list for an MFP and an encryption scheme list for a server.

FIG. 3 is a second encryption scheme list for the MFP.

FIG. 4 is an encryption scheme list for respective terminals.

FIG. 6 is a sequence diagram of Cases A to C.

Figure 5:
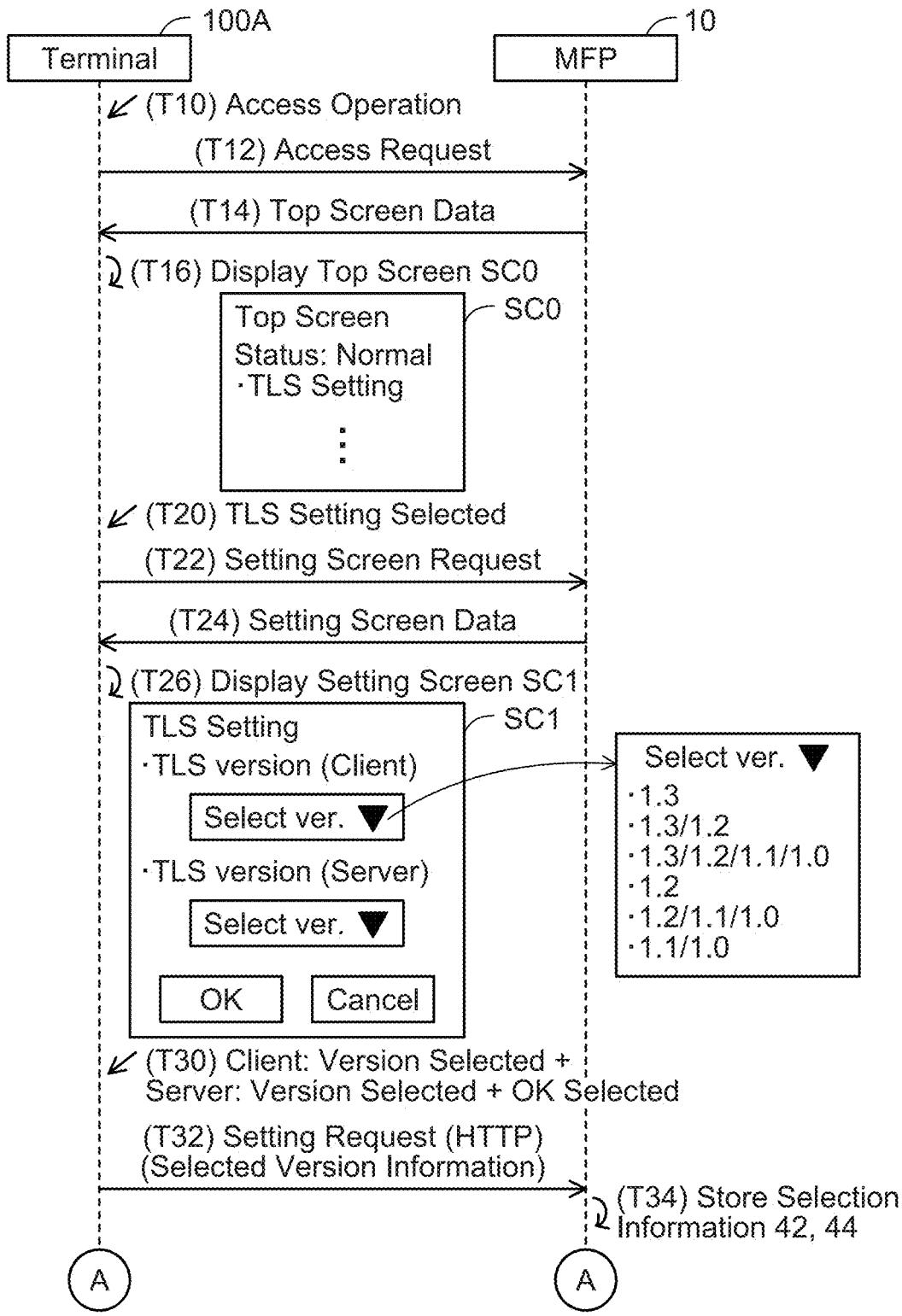
FIG. 5 is a sequence diagram of a first embodiment.

FIRST EMBODIMENT (Configuration of Communication System 2; FIG. 1)

As shown in FIG. 1, a communication system 2 comprises a Multi-Function Peripheral (MFP) 10, three terminals 100A to 100C, and a server 200. The MFP 10 and the respective terminals 100A to 100C are connected to a Local Area Network (LAN) 4, and are configured to communicate with each other via the LAN 4. The LAN 4 may be a wireless LAN or a wired LAN. The LAN 4 is connected to the Internet 6. The server 200 is established on the Internet 6. As such, the respective devices 10, 100A to 100C communicate with the server 200 via the LAN 4 and the Internet 6.

The present embodiment discloses a technology for determining a version of an encrypted communication protocol and an encryption scheme for executing encrypted communication between the MFP 10 and another device (such as the terminals 100A to 100C and the server 200). The encrypted communication protocol is a Transport Layer Security (TLS) protocol.

In TLS, four versions 1.0, 1.1, 1.2, and 1.3 are defined. Version 1.3 is the latest version, and newer versions are more secure. Especially, the security of versions 1.0 and 1.1 is relatively low, while the security of versions 1.2 and 1.3 is relatively high. Further, in regard to compatibility of these versions, there are relatively a large number of devices compatible with versions 1.0 and 1.1 that have long been defined. On the other hand, a number of devices compatible with newer versions 1.2 and 1.3, in particular version 1.3, is still relatively limited.

Although the details will be described later, upon selecting the TLS version, a user can select one of six choices: "1.3", "1.3/1.2", "1.3/1.2/1.1/1.0", "1.2", "1.2/1.1/1.0", and "1.1/1.0" (see FIG. 5). Here, slash mark "/" in the choices means that one of the indicated plurality of versions is to be used. For example, the choice "1.3/1.2" means that either version 1.3 or 1.2 is to be used.

(Configuration of MFP 10)

The MFP 10 is a peripheral device, for example a peripheral device of the terminals 100A to 100C, and is capable of executing a print function, a scan function, and a facsimile function. In a modification, the MFP 10 may be a printer capable of executing only the print function or a scanner capable of executing only the scan function. The MFP 10 is capable of using all of the aforestated four TLS versions (i.e., 1.0 to 1.3). The MFP 10 comprises an operation unit 12, a display unit 14, a communication interface 16, a print engine 18, a scan engine 20, and a controller 30. The respective units 12 to 30 are connected to a bus line. Hereinbelow, an interface will be denoted "I/F".

The operation unit 12 is an I/F that enables the user to input various types of information to the MFP 10, and includes a touch screen and/or buttons, for example. The user can input various types of information to the MFP 10 using the operation unit 12. The display unit 14 is a display for displaying various types of information. The communication I/F 16 is connected to the LAN 4. The print engine 18 comprises a printing mechanism of an inkjet scheme or a laser scheme, for example. The scan engine 20 comprises a scan mechanism such as CIS or CCD, for example.

The controller 30 comprises a CPU 32 and a memory 34. The CPU 32 executes various processes according to a program 36 stored in the memory 34. The memory 34 may for example be a ROM and a RAM. The memory 34 further stores a first encryption scheme list 38, a second encryption scheme list 40, and selection information 42, 44. Details of the first encryption scheme list 38 and the second encryption scheme list 40 will be described later with reference to FIGS. 2 and 3. The selection information 42 indicates a TLS version selected by the user for the MFP 10 operating as a client. The selection information 44 indicates a TLS version selected by the user for the MFP 10 operating as a server. Each of the selection information 42, 44 indicates one version information that is among six types of version information indicated by the aforestated six choices.

(Configuration of Terminal 100A)

The terminal 100A is a portable terminal device such as a cellphone, a smartphone, a PDA, and a tablet PC. In a modification, the terminal 100A may be a stationary PC or a laptop PC. The terminal 100A only supports the TLS version 1.2.

The terminal 100A comprises a communication I/F 116 and a controller 130. The communication I/F 116 and the controller 130 are connected to a bus line. The communication I/F 116 is connected to the LAN 4.

The controller 130 comprises a CPU 132 and a memory 134. The memory 134 stores an OS program 136. The CPU 132 executes various processes according to the OS program 136 stored in the memory 134. The memory 134 may for example be a ROM and a RAM. Hereinbelow, an OS program will be denoted "OS". The OS 136 controls basic operations of the terminal 100A.

The memory 134 further stores an encryption scheme list 140A indicating a list of encryption schemes which the terminal 100A is capable of using. Details of the encryption scheme list 140A will be described later with reference to FIG. 4.

(Configuration of Terminal 100B)

The terminal 100B is configured same as the terminal 100A except that it stores an encryption scheme list 140B instead of the encryption scheme list 140A.

(Configuration of Terminal 100C)

The terminal 100C is configured same as the terminal 100A except that it supports only the TLS version 1.3 and that an encryption scheme list 140C is stored instead of the encryption scheme list 140A.

(Configuration of Server 200)

The server 200 is a server for storing scan data generated by a scan executed by the MFP 10, for example. The server 200 comprises a communication I/F 216 and a controller 230. The communication I/F 216 and the controller 230 are connected to a bus line. The communication I/F 216 is connected to the Internet 6. The server 200 is capable of using all of the aforestated four TLS versions (i.e., 1.0 to 1.3).

The controller 230 comprises a CPU 232 and a memory 234. The memory 234 stores a program 236. The CPU 232 executes various processes according to the program 236 stored in the memory 234. The memory 234 may for example be a ROM and a RAM.

(Respective Encryption Scheme Lists: FIGS. 2 to 4)

Next, respective encryption scheme lists stored in the respective devices 10, 100A to 100C, 200 will be described with reference to FIGS. 2 to 4.

(First Encryption Scheme List 38 and Encryption Scheme List 238; FIG. 2)

FIG. 2 shows the first encryption scheme list 38 stored in the memory 34 of the MFP 10 and an encryption scheme list 238 stored in the memory 234 of the server 200. These lists 38, 238 indicate the same contents. Column 1 indicates an encryption scheme (such as TLS_AES_128_GCM_SHA256). Schemes listed higher in the list are more secure. However, security level and processing efficiency (such as processing speed and volume of memory used by the processing) may contradict in some cases, thus the encryption scheme to be used is determined by giving consideration to the balance between the security level and the processing efficiency. Row 1 indicates six types of version information corresponding to the aforestated six choices. Circle marks indicate available encryption schemes. For example, the version information "1.3" is associated with three circle marks. This means that when the TLS version "1.3" is employed in the MFP 10, for example, the MFP 10 is capable of using one of the three encryption schemes but is not capable of using other encryption schemes.

(Second Encryption Scheme List 40; FIG. 3)

FIG. 3 indicates the second encryption scheme list 40 stored in the memory 34 of the MFP 10. The second encryption scheme list 40 differs from the first encryption scheme list 38 in regard to the circle marks given to the version information "1.3/1.2" and "1.2". That is, in the first encryption scheme list 38, the MFP 10 can use all the encryption schemes when the version "1.3/1.2" is employed. On the other hand, in the second encryption scheme list 40, the MFP 10 can use only the top nine encryption schemes when the version "1.3/1.2" is employed.

The MFP 10 uses the first encryption scheme list 38 in a case where a command according to a Simple Network Management Protocol (SNMP) is received from the terminal 100A. This example will be described in a second embodiment. On the other hand, the MFP 10 uses the second encryption scheme list 40 in a case where a command according to a HyperText Transfer Protocol (HTTP) is received from the terminal 100A.

(Encryption Scheme Lists 140A to 140C; FIG. 4)

FIG. 4 shows the respective encryption scheme lists 140A to 140C of the terminals 100A to 100C. Each of the encryption scheme lists 140A to 140C indicates multiple encryption schemes its corresponding one of the terminals 100A to 100C is capable of using. The encryption scheme list 140A of the terminal 100A supporting only the TLS version 1.2 indicates the respective encryption schemes associated with the version information "1.2" of FIG. 2 (i.e., all the encryption schemes from row 5 in FIG. 2). The encryption scheme list 140B of the terminal 100B supporting only the TLS version 1.2 indicates the respective encryption schemes from row 11 among the encryption schemes associated with the version information "1.2" of FIG. 2. The encryption scheme list 140C of the terminal 100C supporting only the TLS version 1.3 indicates the respective encryption schemes associated with the version information "1.3" of FIG. 2 (i.e., the encryption schemes from row 2 to row 4 in FIG. 2).

(Processes Executed Between Devices; FIG. 5)

Next, processes executed between devices will be described with reference to FIG. 5. Hereinbelow, from the viewpoint of easier understanding, processes executed by the CPUs (such as 32, 132) of the respective devices (such as the MFP 10, terminal 100A) will be described with the respective devices as a subject of action instead of describing them with the CPUs as the subject of action. Further, communication between the devices is executed via their communication I/Fs (such as 16, 116). As such, in the following description, the description "via the communication I/F" will be omitted in explaining the communication.

When the terminal 100A accepts an access operation by the user for accessing a web server of the MFP 10 in T10, it sends an access request to the MFP 10 in T12.

When the access request is received from the terminal 100A in T12, the MFP 10 sends top screen data indicating a top screen SC0 to the terminal 100A in T14.

When the terminal 100A receives the top screen data from the MFP 10 in T14, it displays the top screen SC0 in T16. The top screen SC0 includes a current status of the MFP 10 (such as "normal") and buttons for performing various types of settings (such as "TLS setting") in the MFP 10, for example.

When the terminal 100A accepts selection of the "TLS setting" button in the top screen SC0 from the user in T20, it sends a setting screen request to the MFP 10 in T22.

When the MFP 10 receives the setting screen request from the terminal 100A in T22, it sends setting screen data representing a setting screen SC1 to the terminal 100A in T24.

When the terminal 100A receives the setting screen data from the MFP 10 in T24, it displays the setting screen SC1 in T26. The setting screen SC1 includes a TLS version selection box for the MFP 10 operating as a client, a TLS version selection box for the MFP 10 operating as a server, an OK button, and a cancel button. Hereinbelow, the former selection box and the latter selection box will be termed "client version selection box" and "server version selection box", respectively. When the client version selection box is selected by the user, a choice screen including the aforestated six choices is displayed. Although not shown, a choice screen including the aforestated six choices is displayed also when the server version selection box is selected by the user.

The terminal 100A accepts selection of one of the choices in the client version selection box and accepts a selection of one of the choices in the server version selection box from the user in T30. Hereinbelow, the version information indicated by the choice selected in the client version selection box and the version information indicated by the choice selected in the server version selection box will respectively be denoted "client version information" and "server version information".

After this, when the terminal 100A accepts a selection of the OK button in the setting screen SC1 in T30, it sends a setting request to the MFP 10 in T32. The setting request is a command according to HTTP and includes the client version information and the server version information.

When the MFP 10 receives the setting request from the terminal 100A in T32, it stores selection information 42, 44 in T34. Specifically, the MFP 10 stores the client version information included in the setting request as the selection information 42 and the server version information included in the setting request as the selection information 44.

(Case A: FIG. 6)

Next, specific cases will be described. Firstly, Case A in which the version information "1.2" is selected as the client version information will be described with reference to FIG. 6. Case A of FIG. 6 is a continuation from T34 of FIG. 5, and the selection information 42 indicates the version information "1.2" being the client version information.

In T40, the MFP 10 accepts an operation that triggers encrypted communication with the server 200 from the user. This operation may for example be an operation for causing the MFP 10 to execute scan on a document. In this case, the MFP 10 sends setting information to the server 200 in T42. The setting information includes the selection information 42 (i.e., version information "1.2") and an encryption scheme list. Here, a device that accepted the operation that triggers the encrypted communication operates as a client in this encrypted communication. That is, in this case, the MFP 10 operates as the client (see T40). As such, in T42, the MFP 10 sends the selection information 42 rather than the selection information 44 to the server 200. In T32 of FIG. 5, the MFP 10 has already received the setting request according to HTTP. As such, the encryption scheme list sent in T42 is specified based on the second encryption scheme list 40 (see FIG. 3) corresponding to the HTTP. Specifically, the MFP 10 specifies six encryption schemes associated with the version information "1.2" indicated by the selection information 42 (i.e., the encryption schemes in rows 5 to 10) from the second encryption scheme list 40. Then, the MFP 10 sends an encryption scheme list indicating these six encryption schemes to the server 200.

When the server 200 receives the setting information from the MFP 10 in T42, it determines the version and the encryption scheme to be used in the encrypted communication between the MFP 10 and the server 200 based on the version and the encryption scheme list included in the setting information in T44. Here, the server 200 determines the most secure version and the most secure encryption scheme.

Specifically, firstly the server 200 determines the version to be used in the encrypted communication. In the present case, the server 200 can use all the TLS versions and the version information included in the received setting information is "1.2". As such, the server 200 determines to use the version "1.2".

Then, the server 200 determines the encryption scheme to be used in the encrypted communication by using the encryption scheme list 238 in the memory 234 (see FIG. 2). Firstly, the server 200 specifies the most secure encryption scheme (i.e., the highest encryption scheme) among the encryption schemes associated with the version information "1.2" included in the received setting information (i.e., given the circle marks) from the encryption scheme list 238. In the present case, 200 the server specifies the encryption scheme "TLS_ECDHE_ECDSA_WITH_AES_128_GCM_SHA256" in row 5. Since the specified encryption scheme is included in the encryption scheme list in the received setting information, the server 200 decides on using the specified encryption scheme as above.

Then, in T46, the server 200 sends the determined version and determined encryption scheme to the MFP 10. As above, the version and the encryption scheme to be used in the encrypted communication are shared between the MFP 10 and the server 200.

After this, in T48, a session key to be used in the encrypted communication is shared between the MFP 10 and the server 200. The session key is a key used in a session of the encrypted communication between the MFP 10 and the server 200, and is a key generated according to the determined encryption scheme. Since the session key is shared between the MFP 10 and the server 200 as above, the encrypted communication can be executed between the MFP 10 and the server 200.

After this, in T50, the encrypted communication (such as communication of scan data) is executed between the MFP 10 and the server 200 using the session key shared in T48. As above, encrypted communication can be executed between the MFP 10 and the server 200.

(Case B; FIG. 6)

Next, Case B in which the version information "1.2/1.1/1.0" is selected as the client version information will be described with reference to FIG. 6. Case B is a continuation from T34 of FIG. 5, and the selection information 42 indicates the version information "1.2/1.1/1.0" being the client version information. T60 is same as T40.

In T62, the MFP 10 sends setting information to the server 200. The setting information includes the selection information 42 (i.e., the version information "1.2/1.1/1.0") and an encryption scheme list. Since the MFP 10 has already received the setting request according to HTTP in T32 of FIG. 5, it specifies twenty-five encryption schemes associated with the version information "1.2/1.1/1.0" indicated by the selection information 42 (i.e., encryption schemes from row 5) from the second encryption scheme list 40 corresponding to HTTP. Then, the MFP 10 sends the encryption scheme list indicating these twenty-five encryption schemes to the server 200. Processes hereafter are same as T44 to T50. In Case B as well, encrypted communication can be executed between the MFP 10 and the server 200 similar to Case A.

(Case C; FIG. 6)

Next, Case C in which the version information "1.3/1.2" is selected as the client version information will be described with reference to FIG. 6. Case C is a continuation from T34 of FIG. 5, and the selection information 42 indicates the version information "1.3/1.2" being the client version information. T70 is same as T40.

Figure 7:
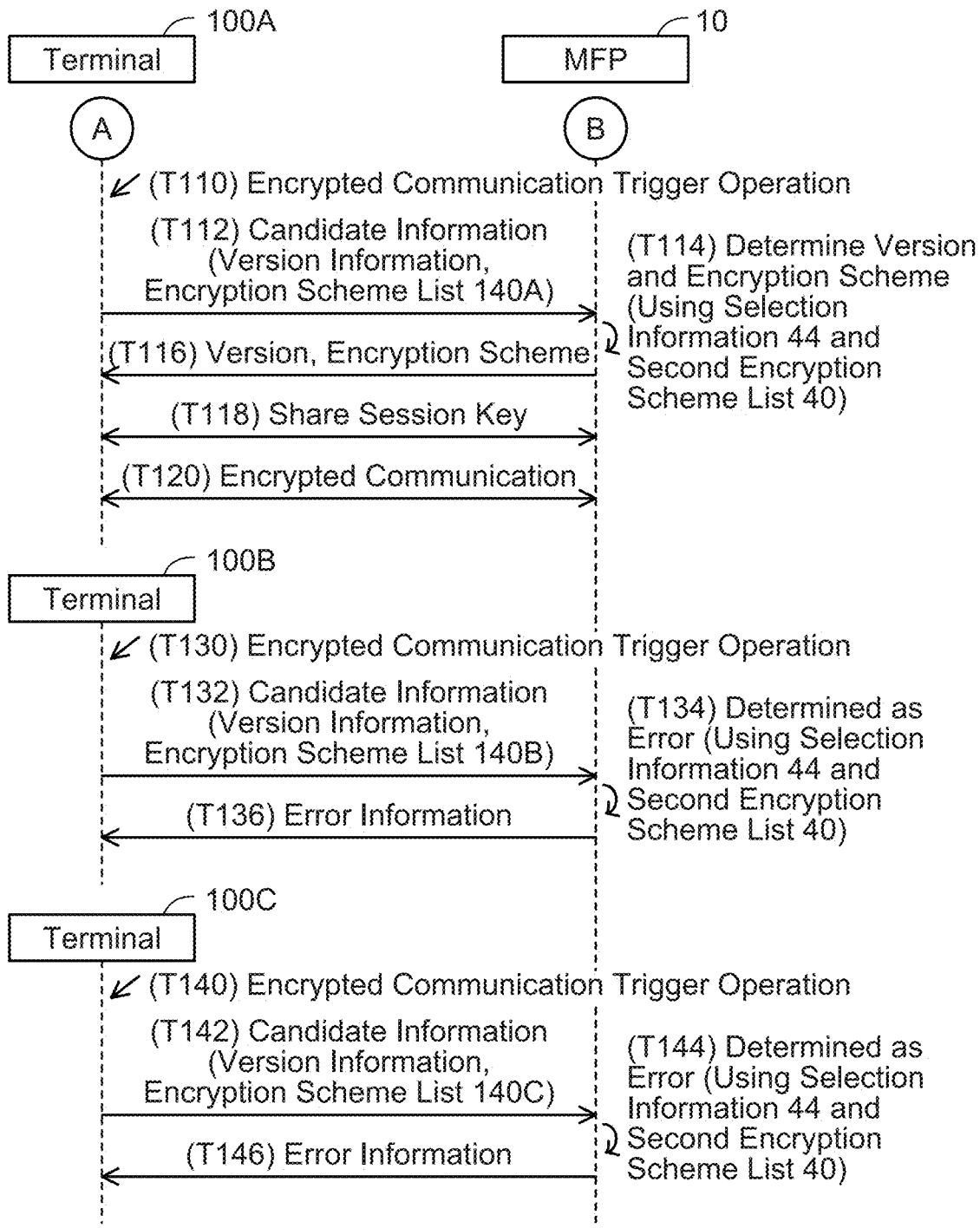
FIG. 7 is a sequence diagram of Case D.

In T72, the MFP 10 sends setting information to the server 200. The setting information includes the selection information 42 (i.e., the version information "1.3/1.2") and an encryption scheme list. Since the MFP 10 has already received the setting request according to HTTP in T32 of FIG. 5, it specifies nine encryption schemes associated with the version information "1.3/1.2" indicated by the selection information 42 (i.e., encryption schemes from row 2 to row 10) from the second encryption scheme list 40 corresponding to HTTP. Then, the MFP 10 sends the encryption scheme list indicating these nine encryption schemes to the server 200. Processes hereafter are same as T44 to T50 except that the version and the encryption scheme to be determined are different. In Case C as well, encrypted communication can be executed between the MFP 10 and the server 200 similar to Case A. Especially in Case C, since the version information "1.3/1.2" has top nine encryption schemes associated therewith in the second encryption scheme list 40, relatively-less secure encryption scheme(s) other than the aforementioned ones will not be used. Thus, secure communication can be realized between the MFP 10 and the server 200. (Case D; FIG. 7)

Next, Case D in which the version information "1.2" is selected as the server version information will be described with reference to FIG. 7. Case D is a continuation from T50 of FIG. 6, and the selection information 44 indicates the version information "1.2" being the server version information.

In T110, the terminal 100A accepts an operation that triggers encrypted communication with the MFP 10 from the user. This operation is an operation for causing the MFP 10 to execute printing, for example. In this case, the terminal 100A sends candidate information to the MFP 10 in T112. The candidate information in T112 includes TLS version(s) and encryption scheme(s) the terminal 100A is capable of using. That is, the candidate information in T112 includes the version information "1.2" and the encryption scheme list 140A.

When the MFP 10 receives the candidate information from the terminal 100A in T112, it determines the version and the encryption scheme to be used in the encrypted communication between the MFP 10 and the terminal 100A in T114. Here, the MFP 10 has already received the setting request according to HTTP in T32 of FIG. 5. Further, in the present case, since the terminal 100A receives the operation that triggers the encrypted communication (see T110), the MFP 10 operates as the server. Thus, in T114, the MFP 10 determines the version and the encryption scheme to be used in the encrypted communication between the MFP 10 and the terminal 100A based on the selection information 44 and the second encryption scheme list 40. Here, the MFP 10 determines the most secure version and the most secure encryption scheme.

Specifically, firstly the MFP 10 determines the version to be used in the encrypted communication. In the present case, the selection information 44 indicates the version information "1.2" and the version information in the received candidate information is "1.2". As such, the MFP 10 decides on using the version "1.2".

Next, the MFP 10 uses the second encryption scheme list 40 in the memory 34 (see FIG. 3) to determine the encryption scheme to be used in the encrypted communication. Firstly, the MFP 10 specifies the most secure encryption scheme (i.e., the highest encryption scheme) among the encryption schemes associated with the version information "1.2" indicated in the selection information 44 (i.e., given the circle marks) from the second encryption scheme list 40. In the present case, the MFP 10 specifies the encryption scheme "TLS_ECDHE_ECDSA_WITH_AES_128_GCM_SHA256" in row 5. Since the specified encryption scheme is included in the encryption scheme list 140A in the received candidate information, the MFP 10 decides on using the above-specified encryption scheme.

Then, in T116, the MFP 10 sends the determined version and determined encryption scheme to the terminal 100A. As above, the version and the encryption scheme to be used in the encrypted communication are shared between the MFP 10 and the terminal 100A.

After this, in T118, a session key to be used in the encrypted communication is shared between the MFP 10 and the terminal 100A. The session key is a key used in a session of the encrypted communication between the MFP 10 and the terminal 100A, and is a key generated according to the determined encryption scheme. Since the session key is shared between the MFP 10 and the terminal 100A as above, the encrypted communication can be executed between the MFP 10 and the terminal 100A.

After this, in T120, the encrypted communication (such as communication of print data) is executed between the MFP 10 and the terminal 100A using the session key shared in T118. As above, encrypted communication can be executed between the MFP 10 and the terminal 100A.

When the terminal 100B accepts an operation that triggers encrypted communication with the MFP 10 from the user in T130, it sends candidate information to the MFP 10 in T132. The candidate information in T132 is same as the candidate information in T112 except that it includes the encryption scheme list 140B.

When the MFP 10 receives the candidate information from the terminal 100B in T132, it determines the version and the encryption scheme to be used in the encrypted communication between the MFP 10 and the terminal 100B in T134. Although the method for determining the version and the encryption scheme to be used in the encrypted communication is same as that of T114, an error is determined in the present case due to the following reason.

Firstly, the MFP 10 determines the version to be used in the encrypted communication. In the present case, the selection information 44 indicates the version information "1.2" and the version information in the candidate information received in T132 is "1.2", thus the MFP 10 decides on using the version "1.2".

Next, the MFP 10 uses the second encryption scheme list 40 in the memory 34 (see FIG. 3) to determine the encryption scheme to be used in the encrypted communication. Firstly, the MFP 10 specifies the most secure encryption scheme (i.e., the highest encryption scheme) among the encryption schemes associated with the version information "1.2" indicated in the selection information 44 (i.e., given the circle marks) from the second encryption scheme list 40. In the present case, the 10 MFP specifies the encryption scheme "TLS_ECDHE_ECDSA_WITH_AES_128_GCM_SHA256" in row 5. This specified encryption scheme is not included in the encryption scheme list 140B in the received candidate information. In this case, the MFP 10 specifies the encryption scheme "TLS_ECDHE_RSA_WITH_AES_128_GCM_SHA256" which is second (the second most secure) to the specified encryption scheme (i.e., the scheme in row 6) from the second encryption scheme list 40. This encryption scheme is also not included in the encryption scheme list 140B in the received candidate information. Hereinbelow, none of the encryption schemes in rows 7 to 10 in the second encryption scheme list 40 are included in the encryption scheme list 140B in the received candidate information. As such, the MFP 10 determines as an error in T134 since there is no encryption scheme that matches the encryption scheme list 140B in the candidate information received from the terminal 100B. In this case, the MFP 10 sends error information to the terminal 100B in T136.

When the terminal 100C accepts an operation that triggers encrypted communication with the MFP 10 from the user in T140, it sends candidate information to the MFP 10 in T142. The candidate information in T142 includes the version information "1.3" and the encryption scheme list 140C.

When the MFP 10 receives the candidate information from the terminal 100C in T142, it determines the version and the encryption scheme to be used in the encrypted communication between the MFP 10 and the terminal 100C in T144. Although the method for determining the version and the encryption scheme to be used in the encrypted communication is same as that of T114, an error is determined in the present case due to the following reason.

Firstly, the MFP 10 determines the version to be used in the encrypted communication. In the present case, the selection information 44 indicates the version information "1.2" and the version information in the candidate information received in T142 is "1.3". As such, since the versions as above do not match, the MFP 10 determines this as an error in T144. In this case, the MFP 10 sends error information to the terminal 100C in T146.

Figure 8:
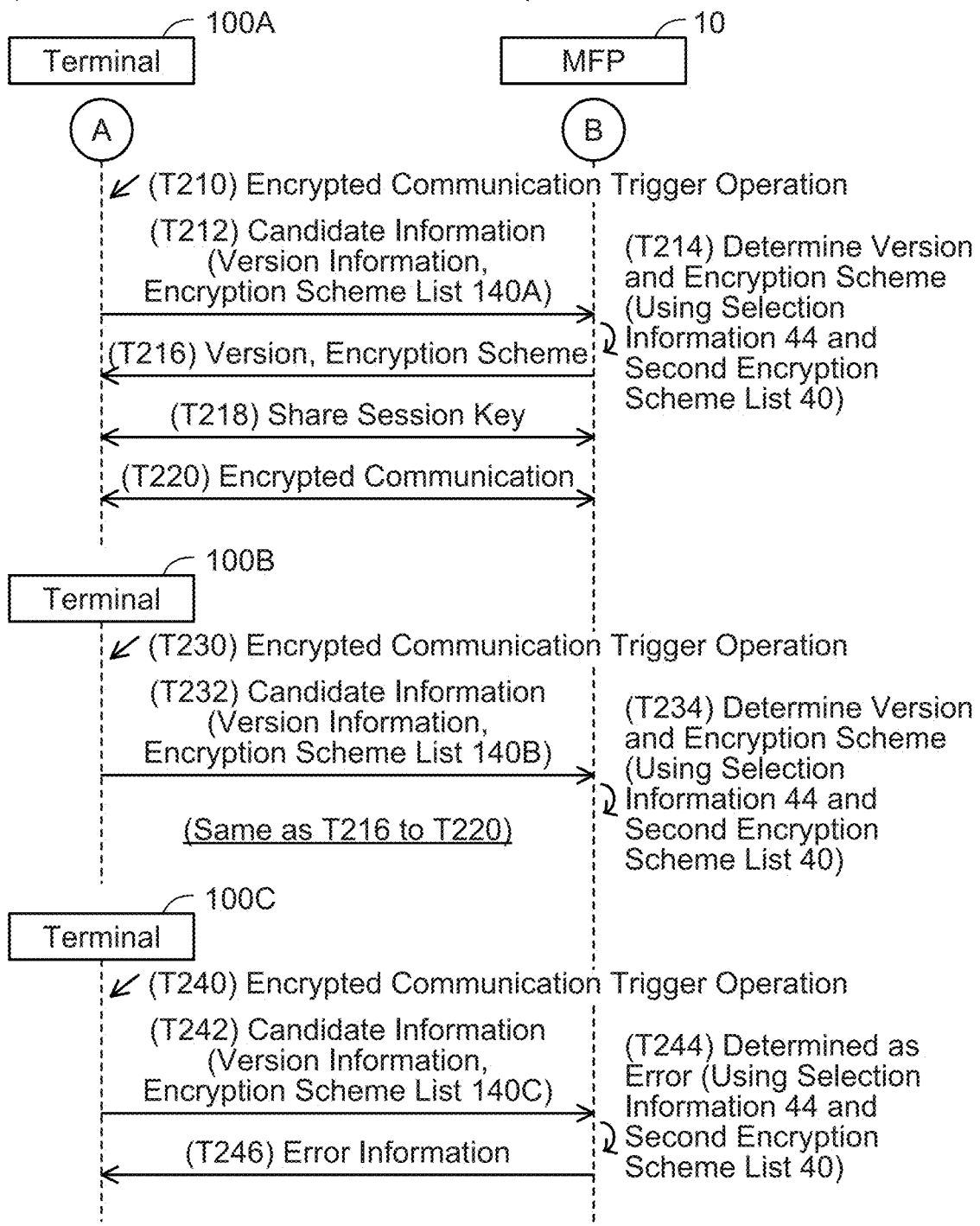
FIG. 8 is a sequence diagram of Case E.

(Case E; FIG. 8)

Next, Case E in which the version information "1.2/1.1/1.0" is selected as the server version information will be described with reference to FIG. 8. Case E is a continuation from T50 of FIG. 6, and the selection information 44 indicates the version information "1.2/1.1/1.0" being the server version information. T210 and T212 are respectively the same as T110 and T112 of FIG. 7.

T214 is same as T114 of FIG. 7 except that the method by which the version and the encryption scheme to be used in the encrypted communication are determined is different. That is, firstly, since the selection information 44 indicates the version information "1.2/1.1/1.0" and the version information in the received candidate information is "1.2", the MFP 10 decides on using the version "1.2".

Then, the MFP 10 uses the second encryption scheme list 40 (see FIG. 3) in the memory 34 to determine the encryption scheme to be used in the encrypted communication. Firstly, the MFP 10 specifies the most secure encryption scheme (i.e., the highest encryption scheme) among the encryption schemes associated with the version information "1.2/1.1/1.0" indicated by the selection information 44 (i.e., given the circle marks) from the second encryption scheme list 40. In the present case, the MFP 10 specifies the encryption scheme "TLS_ECDHE_ECDSA_WITH_AES_128_GCM_SHA256" in row 5. Since the specified encryption scheme is included in the encryption scheme list 140A in the received candidate information, the MFP 10 decides on using the specified encryption scheme as above. T216 to T220 are same as T116 to T120 of FIG. 7.

When the terminal 100B accepts an operation that triggers encrypted communication with the MFP 10 from the user in T230, it sends candidate information to the MFP 10 in T232. T230 and T232 are same as T130 and T132 of FIG. 7 respectively.

When the MFP 10 receives the candidate information from the terminal 100B in T232, it determines the version and the encryption scheme to be used in the encrypted communication between the MFP 10 and the terminal 100B in T234. Specifically, the following processes are executed.

Firstly, the MFP 10 determines the version to be used in the encrypted communication. In the present case, the selection information 44 indicates the version information "1.2/1.1/1.0" and the version information in the candidate information received in T232 is "1.2", thus the MFP 10 decides on using the version "1.2".

Next, the MFP 10 uses the second encryption scheme list 40 in the memory 34 (see FIG. 3) to determine the encryption scheme to be used in the encrypted communication. Firstly, the MFP 10 specifies the most secure encryption scheme (i.e., the highest encryption scheme) among the encryption schemes associated with the version information "1.2/1.1/1.0" indicated in the selection information 44 (i.e., given the circle marks) from the second encryption scheme list 40. In the present case, the MFP 10 specifies the encryption scheme "TLS_ECDHE_ECDSA_WITH_AES_128_GCM_SHA256" in row 5. This specified encryption scheme is not included in the encryption scheme list 140B in the received candidate information. In this the MFP 10 specifies case, the encryption scheme "TLS_ECDHE_RSA_WITH_AES_128_GCM_SHA256" which is second to the specified encryption scheme (i.e., the scheme in row 6) from the second encryption scheme list 40. This encryption scheme is also not included in the encryption scheme list 140B in the received candidate information. None of the encryption schemes in rows 7 to 10 in the second encryption scheme list 40 are included in the encryption scheme list 140B in the received candidate information. Then, the MFP 10 specifies the encryption scheme "TLS_DHE_RSA_WITH_AES_128_GCM_SHA256" in row 11 from the second encryption scheme list 40. Since this encryption scheme is included in the encryption scheme list 140B in the candidate information received from the terminal 100B, the MFP 10 decides on using this encryption scheme. The processes that take place herefrom are same as T216 to T220 except that the encryption scheme to be used is different.

When the terminal 100C accepts an operation that triggers encrypted communication with the MFP 10 from the user in T240, it sends candidate information to the MFP 10 in T242. T240 and T242 are same as T140 and T142 of FIG. 7 respectively.

The process of T244 is same as T144 of FIG. 7 except that a logic by which an error is determined is different. That is, the selection information 44 indicates the version "1.2/1.1/1.0" and the version information in the received candidate information indicates "1.3". As such, since the versions as above do not match, the MFP 10 decides this as an error in T244. In this case, the MFP 10 sends error information to the terminal 100C in T246.

Figure 9:
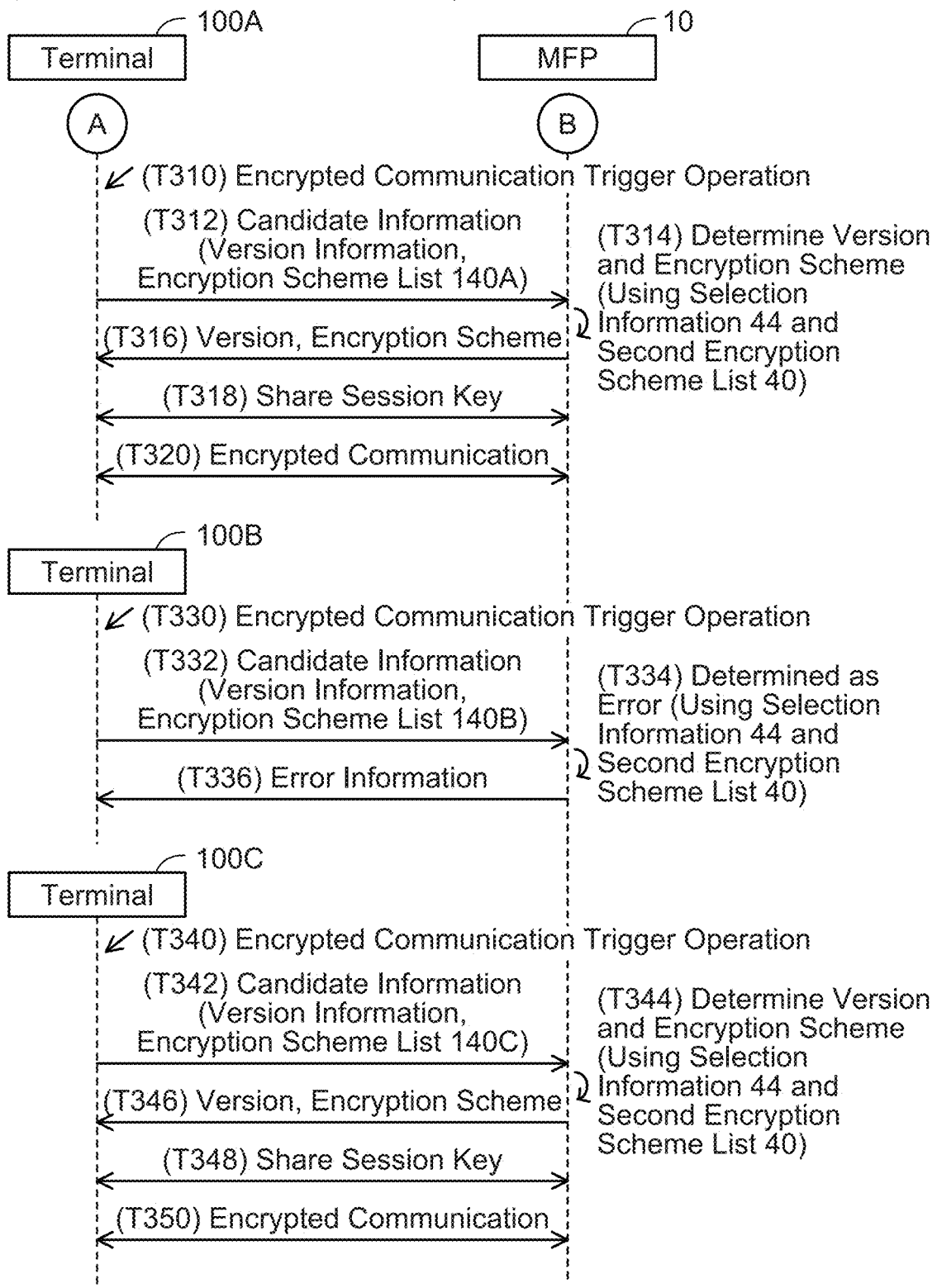
FIG. 9 is a sequence diagram of Case F.

(Case F; FIG. 9)

Next, Case F in which the version information "1.3/1.2" is selected as the server version information will be described with reference to FIG. 9. Case F is a continuation from T50 of FIG. 6, and the selection information 44 indicates the version information "1.3/1.2" being the server version information. T310 and T312 are respectively the same as T110 and T112 of FIG. 7.

T314 is same as T114 of FIG. 7 except that the method by which the version and the encryption scheme to be used in the encrypted communication are determined is different. That is, firstly, since the selection information 44 indicates the version information "1.3/1.2" and the version information in the received candidate information is "1.2", the MFP 10 decides on using the version "1.2".

Then, the MFP 10 uses the second encryption scheme list 40 (see FIG. 3) in the memory 34 to determine the encryption scheme to be used in the encrypted communication. Firstly, the MFP 10 specifies the most secure encryption scheme (i.e., the highest encryption scheme) among the encryption schemes associated with the version information "1.3/1.2" indicated by the selection information 44 (i.e., given the circle marks) from the second encryption scheme list 40. In the present case, the MFP 10 specifies the encryption scheme "TLS_AES_128_GCM_SHA256" in row 2. This specified encryption scheme is not included in the encryption scheme list 140A in the received candidate information. In this case, the MFP 10 specifies the encryption scheme "TLS_AES_256_GCM_SHA384" which is second to the specified encryption scheme (i.e., the scheme in row 3) from the second encryption scheme list 40. This encryption scheme is also not included in the encryption scheme list 140A in the received candidate information. Similarly, the encryption scheme in row 4 of the second encryption scheme list 40 is also not included in the encryption scheme list 140A in the received candidate information. Then, the MFP 10 specifies the encryption scheme "TLS_ECDHE_ECDSA_WITH_AES_128_GCM_SHA256" in row 5 from the second encryption scheme list 40. Since this encryption scheme is included in the encryption scheme list 140A in the candidate information received from the terminal 100A, the MFP 10 decides on using this encryption scheme. The processes that take place herefrom are same as T116 to T120 of FIG. 7.

When the terminal 100B accepts an operation that triggers encrypted communication with the MFP 10 from the user in T330, it sends candidate information to the MFP 10 in T332. T330 and T332 are same as T130 and T132 of FIG. 7 respectively.

T334 is same as T134 of FIG. 7 except that a logic by which an error is determined is different. That is, since the selection information 44 indicates the version information "1.3/1.2" and the version information in the received candidate information indicates "1.2", the MFP 10 decides on using the version "1.2".

Then, the MFP 10 uses the second encryption scheme list 40 (see FIG. 3) in the memory 34 to determine the encryption scheme to be used in the encrypted communication. Firstly, the MFP 10 specifies the most secure encryption scheme (i.e., the highest encryption scheme) among the encryption schemes associated with the version information "1.3/1.2" indicated by the selection information 44 (i.e., given the circle marks) from the second encryption scheme list 40. In the present case, the MFP 10 specifies the encryption scheme "TLS_AES_128_GCM_SHA256" in row 2. This specified encryption scheme is not included in the encryption scheme list 140B in the received candidate information. In this case, the MFP 10 specifies the encryption scheme "TLS_AES_256_GCM_SHA384" which is second to the specified encryption scheme (i.e., the scheme in row 3) from the second encryption scheme list 40. This encryption scheme is also not included in the encryption scheme list 140B in the received candidate information. Hereinbelow, none of the encryption schemes in rows 4 to 10 in the second encryption scheme list 40 are included in the encryption scheme list 140B in the received candidate information. As such, the MFP 10 determines as an error in T334 since there is no encryption scheme that matches the encryption scheme list 140B in the candidate information received from the terminal 100B. In this case, the MFP 10 sends error information to the terminal 100B in T336.

When the terminal 100C accepts an operation that triggers encrypted communication with the MFP 10 from the user in T340, it sends candidate information to the MFP 10 in T342. T340 and T342 are same as T140 and T142 of FIG. 7 respectively.

When the MFP 10 receives the candidate information from the terminal 100C in T342, it determines the version and the encryption scheme to be used in the encrypted communication between the MFP 10 and the terminal 100C in T344. Specifically, the following processes are executed. Firstly, the MFP 10 determines the version to be used in the encrypted communication. In the present case, the selection information 44 indicates the version information "1.3/1.2" and the version information in the candidate information received in T342 is "1.3". Thus, the MFP 10 decides on using the version "1.3".

Then, the MFP 10 uses the second encryption scheme list 40 (see FIG. 3) in the memory 34 to determine the encryption scheme to be used in the encrypted communication. Firstly, the MFP 10 specifies the most secure encryption scheme (i.e., the highest encryption scheme) among the encryption schemes associated with the version "1.3/1.2" indicated by the selection information 44 (i.e., given the circle marks) from the second encryption scheme list 40. In the present case, the MFP 10 specifies the encryption scheme "TLS_AES_128_GCM_SHA256" in row 2. Since this specified encryption scheme is included in the encryption scheme list 140C in the received candidate information, the MFP 10 decides on using this specified encryption scheme. T346 to T350 are same as T116 to T120 of FIG. 7 except that the version and the encryption scheme to be used are different. Especially in Case F, the version information "1.3/1.2" has only the top nine encryption schemes associated therewith in the second encryption scheme list 40, thus relatively-less secure encryption scheme(s) other than the aforementioned ones will not be used. Thus, secure communication can be realized between the MFP 10 and the terminal 100C.

Effects of First Embodiment

According to the above configuration, the MFP 10 sends the setting information to the server 200 (T42 of FIG. 6) in the case where the setting request not including the versions "1.0" and "1.1" but including the version "1.2" is received from the terminal 100A (see T32 of FIG. 5, Case A of FIG. 6). The setting information includes the version "1.2" and the encryption schemes associated with the version "1.2" in the second encryption scheme list 40. Especially, the setting information does not include the encryption schemes from row 10 in the second encryption scheme list 40 although the MFP 10 can use these encryption schemes (see the first encryption scheme list 38 (FIG. 2)). As above, the encryption schemes listed in higher rows in the second encryption scheme list 40 are more secure. Due to this, use of a more secure encryption scheme is determined by the server 200. As a result, secure communication can be realized between the MFP 10 and the server 200.

Further, according to the above configuration, the MFP 10 receives the setting request not including the versions "1.0" and "1.1" but including the version "1.2" from the terminal 100A (see T32 of FIG. 5, Case D of FIG. 7) and receives the candidate information including the version "1.2" and the encryption scheme list 140B from the terminal 100B (T132 of FIG. 7). The encryption scheme list 140B includes the encryption schemes from row 11 in the second encryption scheme list 40 but does not include the encryption schemes in rows 2 to 10. In this case, the MFP 10 does not determine any of the encryption schemes from row 11 in the second encryption scheme list 40 as the encryption scheme to be used in the encrypted communication (T136) although the MFP 10 can use these encryption schemes (see the first encryption scheme list 38 (FIG. 2)). As such, execution of encrypted communication using a relatively-less secure encryption scheme between the MFP 10 and the terminal 100B can be suppressed. Due to this, secure communication can be realized between the MFP 10 and the terminal 100B.

Further, as describes above, although the security level becomes higher with higher TLS versions, there is a possibility that the compatibility becomes relatively lower. Especially in the present embodiment, the version and the encryption scheme to be used in the encrypted communication are determined by using the second encryption scheme list 40 in the memory 34 of the MFP 10. In the setting screen SC1, in a situation where the user selects the version information "1.2", there is a high possibility that the user is seeking for higher security than higher compatibility. In the second encryption scheme list 40, since only the top nine encryption schemes are associated with the version information "1.2", only the encryption schemes which are relatively more secure can be determined as the encryption scheme to be used. As such, secure communication can be realized between the MFP 10 and another device. Further, in a situation where the user selects the version information "1.2/1.1/1.0" in the setting screen SC1, there is a high possibility that the user is seeking for higher compatibility than higher security. In the second encryption scheme list 40, since all the encryption schemes are associated with the version information "1.2/1.1/1.0", the compatibility in the encrypted communication can be increased.

Further, in the setting screen SC1 (see T26 of FIG. 5), the user can simply select the version information, and the version and the encryption scheme to be used in the encrypted communication for the MFP 10 and another device are determined without having have to select the encryption scheme. Due to this, user convenience is improved.

(Corresponding Relationship)

TLS is an example of "encrypted communication protocol". The MFP 10 is an example of "first communication device". In Cases A to C, the server 200 is an example of "second communication device". In Cases D to F, each of the terminals 100A to 100C is an example of "second communication device". The versions 1.1 and 1.0 are examples of "first version". The versions 1.2 and 1.3 are respectively an example of "second version" and "third version". The encryption schemes from row 11 in the second encryption scheme list 40 are examples of "first encryption scheme". The six encryption schemes associated with the version information "1.2" in the second encryption scheme list 40 (i.e., encryption schemes from row 5 to row 10) are examples of "second encryption scheme". The three encryption schemes associated with the version information "1.3" in the second encryption scheme list 40 (i.e., encryption schemes in rows 2 to 4) are examples of "third encryption scheme". The setting request in T32 of FIG. 5 is an example of "setting request (and first to third setting requests)". The setting information in T42, the setting information in T62, and the setting information in T72 are respectively an example of "first setting information", "second setting information", and "third setting information". The candidate information in T112, the candidate information in T132, and the candidate information in T142 of FIG. 7 are respectively an example of "first candidate information", "second candidate information", and "third candidate information". The setting screen SC1 is an example of "first screen".

T32 of FIG. 5 is an example of "obtain a setting request". T50 of FIGS. 6 and T120 of FIG. 7 are examples of "execute encrypted communication". T42, T62, and T72 of FIG. 6 are examples of "send setting information". In particular, T42, T62, and T72 of FIG. 6 are respectively an example of "send first setting information", "send second setting information", and "send third setting information". T112, T132, and T142 of FIG. 7 are examples of "receive candidate information". T114, T134, and T144 of FIG. 7 are examples of "determine a target version and a target encryption scheme".

SECOND EMBODIMENT

Next, a second embodiment will be described. In the second embodiment, a setting request is sent to the MFP 10 by using a setting application program 138 installed on the terminal 100A. Especially, in the second embodiment, the user can select the encryption scheme in addition to selecting the version information (see setting screen SC10 in FIG. 10 for example).

As shown in FIG. 1, the memory 34 of the MFP 10 further stores candidate tables 46, 48. The candidate table 46 stores a TLS version selected by the user for the MFP 10 operating as the client and an encryption scheme selected by the user in association with each other. The candidate table 48 stores a TLS version selected by the user for the MFP 10 operating as the server and an encryption scheme selected by the user in association with each other.

Further, the memory 134 of the terminal 100A further stores the setting application program 138. Hereinbelow, an application program will be denoted as "app". The setting app 138 is an application for performing settings related to the encrypted communication of the MFP 10. The setting app 138 may for example be downloaded from a server on the Internet 6 provided by a vendor of the MFP 10 and be installed in the terminal 100A.

Figure 10:
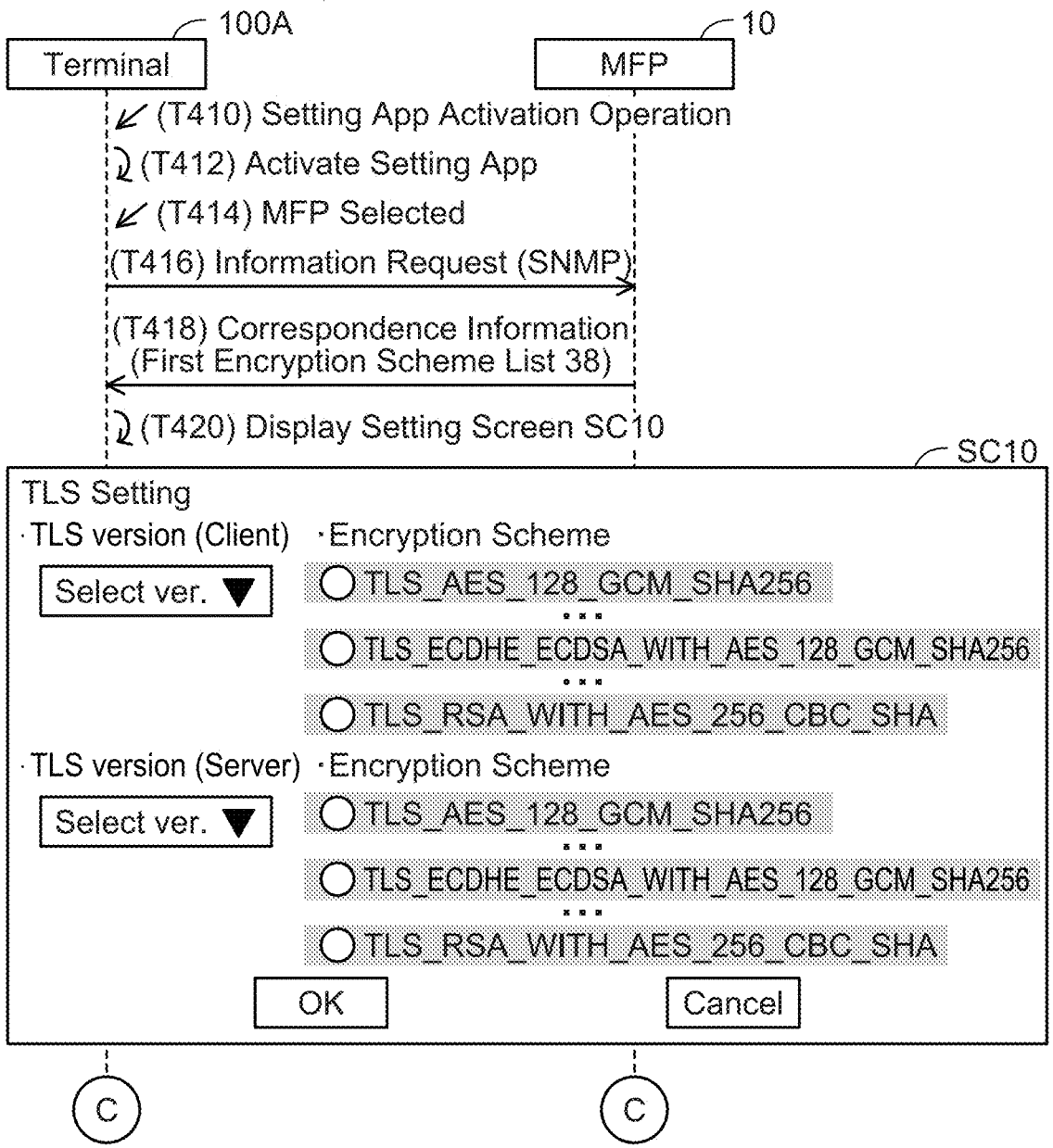
FIG. 10 is a sequence diagram of a second embodiment.

(Processes Executed Between Devices; FIG. 10)

Next, processes executed between the devices will be described with reference to FIG. 10. In T410, when the terminal 100A accepts an operation for activating the setting app 138 from the user, it activates the setting app 138 in T412. Processes from T414 are realized by the CPU 132 of the terminal 100A executing the activated setting app 138. For the sake of explanation, the terminal 100A will be described as the subject of action when explaining these processes.

In T414, the terminal 100A accepts an operation to select the MFP 10 by the user. For example, one or more MFPs including the MFP 10 are registered in the setting app 138, and in T414, the terminal 100A accepts an operation of selecting the MFP 10 from among the registered one or more MFPs. In this case, the terminal 100A sends an information request to the MFP 10 in T416. The information request is a command according to SNMP, and is a command that requests transmission of a list of TLS versions and encryption schemes which the MFP 10 is capable of using.

When the MFP 10 receives the information request from the terminal 100A in T416, it sends corresponding information to the terminal 100A in T418. Since the information request is a command according to SNMP, the corresponding information in T418 includes the first encryption scheme list 38 corresponding to SNMP.

When the terminal 100A receives the corresponding information from the MFP 10 in T418, it displays the setting screen SC10 in T420. The setting screen SC10 includes, in addition to the respective pieces of information in the setting screen SC1, an encryption scheme selecting region associated with the client version selection box and an encryption scheme selecting region associated with the server version selection box. The encryption scheme selecting regions associated with the respective selection boxes include the respective encryption schemes included in the received first encryption scheme list 38 and check boxes associated with those encryption schemes. At the point of T420, no version information is described in the version selection boxes. In this case, the respective encryption schemes are displayed in an unselectable manner (grayed out in this embodiment), thus the check boxes corresponding thereto cannot be selected.

Figure 11:
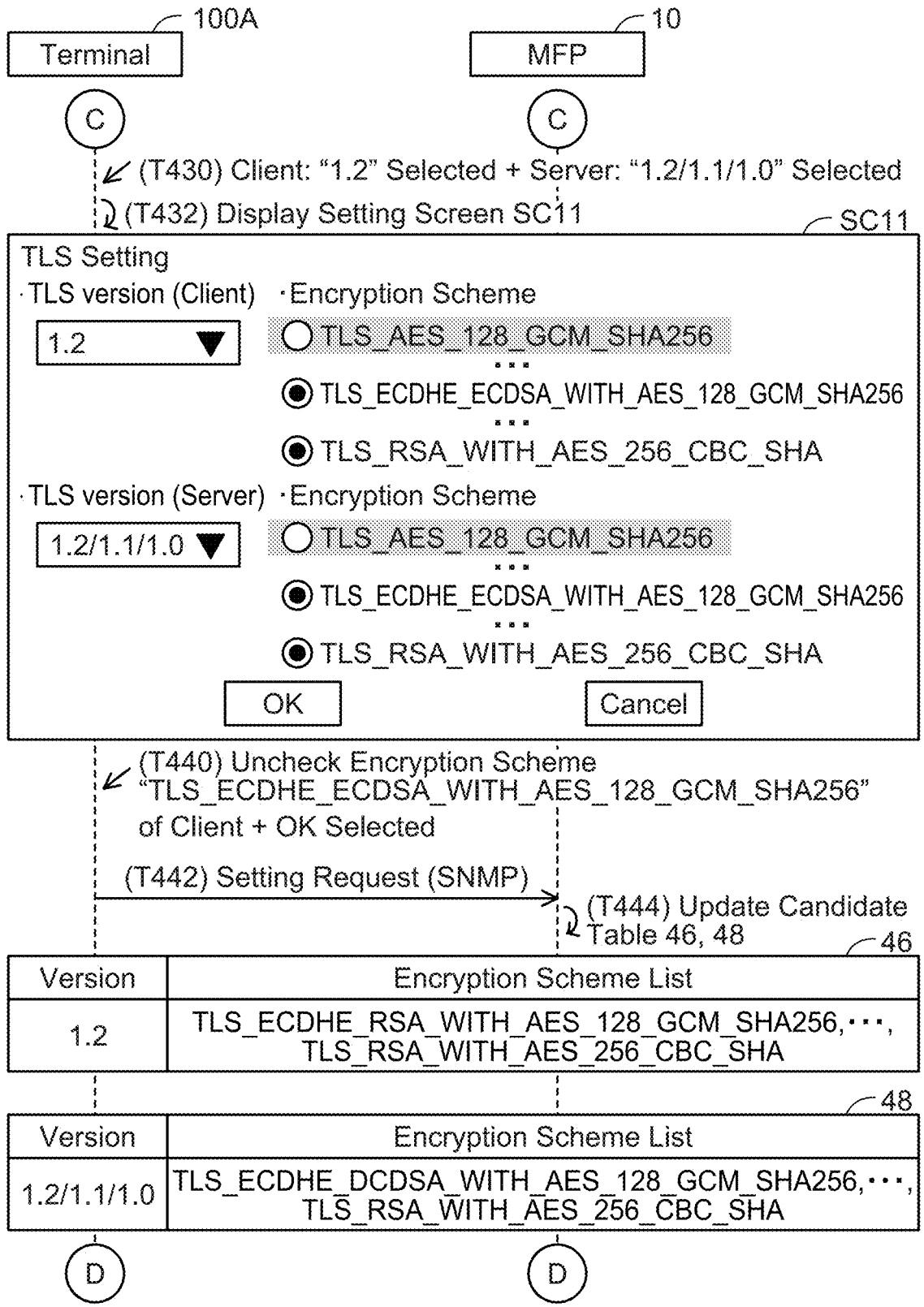
FIG. 11 is a sequence diagram continued from FIG. 10.

(Continuation of FIG. 10; FIG. 11)

In T430 of FIG. 11, the terminal 100A accepts a selection of the choice "1.2" in the client version selection box and a selection of "1.2/1.1/1.0" in the server version selection box. In this case, the terminal 100A displays a setting screen SC11 in T432. The setting screen SC11 describes the selected version information "1.2" and "1.2/1.1/1.0" in the client version selection box and the server version selection box respectively. Further, in the encryption scheme selecting regions, the encryption schemes associated with the version information described in each of the version selection boxes in the received first encryption scheme list 38 are displayed in a selectable manner, and check marks are given to their check boxes. That is, in the present case, since twenty-five encryption schemes from row 5 in the first encryption scheme list 38 are associated to each of the version information "1.2" and "1.2/1.1/1.0", these twenty-five encryption schemes are displayed in the selectable manner, and the check marks are given to their check boxes. In a modification, the setting screen SC11 may not have the check marks in the respective check boxes. Further, in the first encryption scheme list 38, the encryption schemes in rows 2 to 4 that are not associated with the version information "1.2" and "1.2/1.1/1.0" are displayed in an unselectable manner.

After this, in T440, the terminal 100A removes the check mark (uncheck) in the check box corresponding to the encryption scheme "TLS_ECDHE_ECDSA_WITH_AES_128_GCM_SHA256" in the encryption scheme selecting region associated with the client version selection box in the setting screen SC11 and thereafter accepts a selection of the OK button. In this case, the terminal 100A sends a setting request according to SNMP to the MFP 10 in T442. The setting request includes the client version information and the encryption schemes to which the check marks are given in the encryption scheme selecting region associated with the client version selection box, and includes the server version information and the encryption schemes to which the check marks are given in the encryption scheme selecting region associated with the server version selection box.

When the MFP 10 receives the setting request from the terminal 100A in T442, it updates the candidate tables 46, 48 in T444. Specifically, the MFP 10 firstly associates the client version information included in the received setting request (which is "1.2" in the present case) with each of the encryption schemes given the check marks in the encryption scheme selecting region associated with the client version selection box (which are in the present case the encryption schemes in rows 6 to 29 in the list 38 of FIG. 2), and stores the same in the candidate table 46. Then, the MFP 10 associates the client version information included in the received setting request (which is "1.2/1.1/1.0" in the present case) with each of the encryption schemes given the check marks in the encryption scheme selecting region associated with the client version selection box (which are in the present case the encryption scheme from row 5 in the list 38 of FIG. 2), and stores the same in the candidate table 48.

Figure 12:
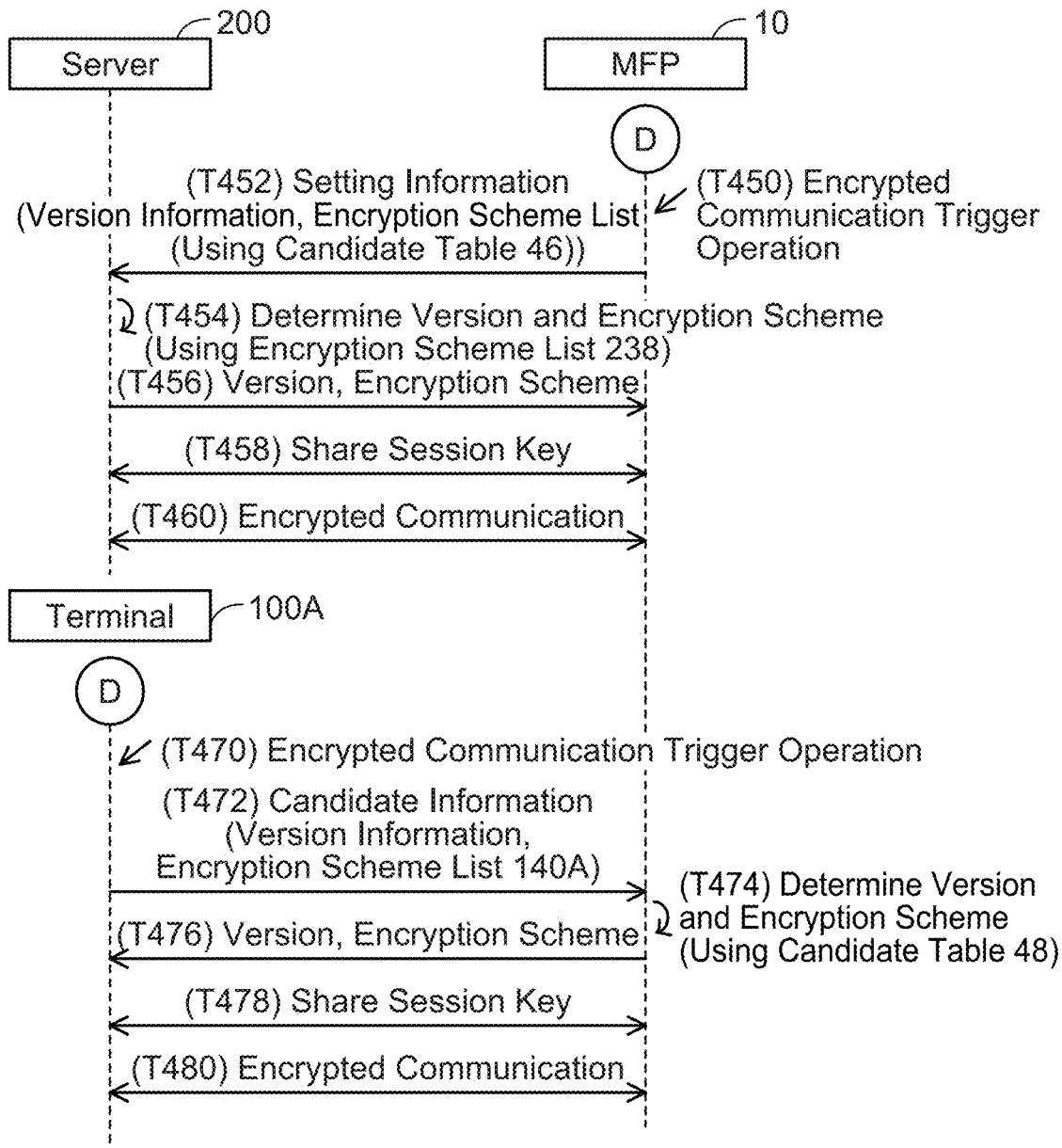
FIG. 12 is a sequence diagram continued from FIG. 11.

(Continuation of FIG. 11; FIG. 12)

When the MFP 10 accepts an operation that triggers encrypted communication with the server 200 in T450, it sends setting information to the server 200 in T452. The setting information includes the respective pieces of information in the candidate table 46 (i.e., the version information "1.2" and the encryption scheme list). Here, the device that accepted the operation that triggers the encrypted communication operates as the client in this encrypted communication. That is, in the present case, the MFP 10 operates as the client (see T450). As such, the MFP 10 sends the respective pieces of information in the candidate table 46 rather than the candidate table 48 to the server 200 in T452.

When the server 200 receives the setting information from the MFP 10 in T452, it determines the version and the encryption scheme to be used in the encrypted communication between the MFP 10 and the server 200 based on the version information and the encryption scheme list included in the setting information in T454. Here, the server 200 determines the most secure version and the most secure encryption scheme.

Specifically, firstly the server 200 determines the version to be used in the encrypted communication. In the present case, the server 200 can use all the TLS versions and the version information included in the received setting information is "1.2". As such, the server 200 decides on using the version "1.2".

Then, the server 200 determines the encryption scheme to be used in the encrypted communication by using the encryption scheme list 238 in the memory 234 (see FIG. 2). Firstly, the server 200 specifies the most secure encryption scheme (i.e., the highest encryption scheme) among the encryption schemes associated with the version information "1.2" included in the received setting information (i.e., given the circle marks) from the encryption scheme list 238. In the present case, the server 200 specifies the encryption scheme "TLS_ECDHE_ECDSA_WITH_AES_128_GCM_SHA256" in row 5. This specified encryption scheme is not included in the encryption scheme list in the received setting information. In this case, the server 200 specifies the encryption scheme "TLS_ECDHE_RSA_WITH_AES_128_GCM_SHA256" which is second to the specified encryption scheme (i.e., the scheme in row 6). Since the specified encryption scheme is included in the encryption scheme list in the received setting information, the server 200 decides on using the specified encryption scheme. T456 to T460 are respectively same as T46 to T50 of FIG. 6 except that the encryption schemes are different.

T470 and T472 are respectively same as T210 and T212 of FIG. 8. When the MFP 10 receives the candidate information from the terminal 100A in T472, it determines the version and the encryption scheme to be used in the encrypted communication between the MFP 10 and the terminal 100A in T474. Here, the MFP 10 has already received the setting request according to SNMP in T442 of FIG. 11. Further in the present case, since the terminal 100A accepts the operation that triggers encrypted communication (see T470), the MFP 10 operates as the server. As such, the MFP 10 determines the version and the encryption scheme to be used in the encrypted communication between the MFP 10 and the terminal 100A based on the candidate table 48 in T474. Here, the MFP 10 determines the most secure version and the most secure encryption scheme.

Specifically, firstly the MFP 10 determines the version to be used in the encrypted communication. In the present case, the version information in the candidate table 48 indicates "1.2/1.1/1.0" and the version information in the received candidate information is "1.2". As such, the MFP 10 decides on using the version "1.2".

Then, the MFP 10 uses the candidate table 48 in the memory 34 (see FIG. 11) to determine the encryption scheme to be used in the encrypted communication. Firstly, the MFP 10 specifies the most secure encryption scheme (i.e., the highest encryption scheme) from among the encryption schemes in the encryption scheme list of the candidate table 48 (i.e., the highest encryption scheme). In the present case, the MFP 10 specifies the encryption scheme "TLS_ECDHE_ECDSA_WITH_AES_128_GCM_SHA256". Since the specified encryption scheme is included in the encryption scheme list 140A in the received candidate information, the MFP 10 decides on using the aforestated encryption scheme. T476 to T480 are respectively the same as T216 to T220 of FIG. 8.

Effects of Second Embodiment

As above, in the second embodiment, the user can select not only the version information but also the encryption scheme in the setting screen SC10 (see T420 of FIG. 10). Due to this, encrypted communication using the encryption scheme sought for by the user can be realized. Especially, the encryption schemes which the user can select (i.e., the encryption schemes that are not grayed out in the setting screen SC10 for example) are determined based on the first encryption scheme list 38 (see T418 of FIG. 10). As such, as compared to a comparative example in which the encryption schemes that the user can select are determined based on the second encryption scheme list 40, the user can select a suitable encryption scheme from among a larger number of choices.

(Corresponding Relationship)

The setting request in T442 of FIG. 11 is an example of "fourth setting request". The setting information in T452 of FIG. 12 is an example of "fourth setting information". The encryption scheme given a check mark in T442 of FIG. 11 and the encryption scheme in the candidate information of T472 of FIG. 12 are respectively an example of "M encryption schemes" and "N encryption schemes". The setting screen SC11 is an example of "second screen".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) The MFP 10 may display the setting screen SC1 on the display unit 14 when it receives an operation to perform TLS setting from the user via the operation unit 12. In this modification, accepting this operation is an example of "obtaining a setting request".

(Modification 2) In the above embodiments, the MFP 10 uses the first encryption scheme list 38 in a case of receiving a command according to SNMP (T416, T418 of FIG. 11) and uses the second encryption scheme list 40 when it receives a command according to HTTP (see T32 of FIG. 5, T42 of FIG. 6). In a modification, the MFP 10 may use the first encryption scheme list 38 when it receives a command according to HTTP including information indicating that the first encryption scheme list 38 should be used, instead of a command according to SNMP.

(Modification 3) The technology described above can be applied to encrypted communication protocols other than TLS. In general terms, "encrypted communication protocol" may be an encrypted communication protocol different from TLS.

(Modification 4) The terminal 100A may omit T416 and T418 of FIG. 10. In this case, the terminal 100A may display a setting screen in which the respective encryption schemes are displayed in a selectable manner in T420. Further, the respective encryption schemes may be displayed in a selectable manner even after a version has been selected in the version selection box in the setting screen.

(Modification 5) In the above embodiments, the processes in the respective steps of FIGS. 5 to 12 are realized by software (such as the programs 36, 236 and the OS program 136), however, at least one of these processes may be realized by hardware such as a logic circuit.

What is claimed is:

1. A first communication device, wherein
the first communication device supports a first version of an encrypted communication protocol and a second version of the encrypted communication protocol, the second version being newer than the first version,
the first version is capable of using a first encryption scheme,
the second version is capable of using the first encryption scheme and a second encryption scheme which is more secure than the first encryption scheme,
the first communication device comprises a controller, and
the controller is configured to:
obtain a setting request related to the encrypted communication protocol;
after the setting request has been obtained, send setting information according to the setting request to a second communication device; and
after the setting information has been sent to the second communication device, execute an encrypted communication with the second communication device by using a version and an encryption scheme that were determined by the second communication device based on the setting information,
wherein in a case where a first setting request not including first version information indicating the first version but including second version information indicating the second version is obtained, the controller is configured to send first setting information to the second communication device, the first setting information including the second version information and second scheme information indicating the second encryption scheme but not including first scheme information indicating the first encryption scheme, and
in a case where a second setting request including the first version information and the second version information is obtained, the controller is configured to send second setting information to the second communication device, the second setting information including the first version information, the second version information, the first scheme information, and the second scheme information.

2. The first communication device as in claim 1, wherein
the first communication device further supports a third version of the encrypted communication protocol, the third version being newer than the second version,
the third version is incapable of using the first encryption scheme and the second encryption scheme and capable of using a third encryption scheme which is more secure than the second encryption scheme, and in a case where a third setting request not including the first version information but including the second version information and third version information indicating the third version is obtained, the controller is configured to send third setting information to the second communication device, the third setting information including the second version information, the third version information indicating the third version, the second scheme information, and third scheme information indicating the third encryption scheme but not including the first scheme information.

3. The first communication device as in claim 1, wherein in a case where the second version is selected by a user on a first screen, the controller is configured to obtain the first setting request not including the first version information but including the second version information, in a case where the first version and the second version are selected by the user on the first screen, the controller is configured to obtain the second setting request which includes the first version information and the second version information, and an encryption key is not capable of being selected on the first screen.

4. The first communication device as in claim 3, wherein in a case where, on a second screen different from the first screen, the second version is selected by the user and one or more encryption schemes are selected by the user from among a plurality of encryption schemes that the second version is capable of using, the controller is configured to obtain a fourth setting request including the second version information and one or more scheme information indicating the one or more encryption schemes, the plurality of encryption schemes including the first encryption scheme and the second encryption scheme, and in a case where the fourth setting request is obtained, the controller is configured to send fourth setting information to the second communication device, the fourth setting information including the second version information and the one or more scheme information.

5. The first communication device as in claim 1, wherein the encrypted communication protocol is a protocol according to Transport Layer Security (TLS).

6. A first communication device, wherein the first communication device supports a first version of an encrypted communication protocol and a second version of the encrypted communication protocol, the second version being newer than the first version, the first version is capable of using a first encryption scheme, the second version is capable of using the first encryption scheme and a second encryption scheme which is more secure than the first encryption scheme, the first communication device comprises a controller, and the controller is configured to:

obtain a setting request related to the encrypted communication protocol;

after the setting request has been obtained, receive candidate information from a second communication device, the candidate information including version information indicating a version of the encrypted communication protocol which the second communication device is capable of using and scheme information indicating an encryption scheme which the second communication device is capable of using;

determine a target version and a target encryption scheme, the target version being a version of the encrypted communication protocol to be used in the encrypted communication with the second communication device, and the target encryption scheme being an encryption scheme to be used in the encrypted communication with the second communication device; and execute the encrypted communication with the second communication device by using the target version and the target encryption scheme, wherein in a case where a first setting request not including first version information indicating the first version but including second version information indicating the second version is obtained and first candidate information including the second version information and second scheme information indicating the second encryption scheme is received from the second communication device, the controller is configured to determine the second version as the target version and determine the second encryption scheme as the target encryption scheme, in a case where the first setting request is obtained and second candidate information including the second version information and first scheme information indicating the first encryption scheme but not including the second scheme information is received from the second communication device, the first encryption scheme is not determined as the target encryption scheme, in a case where a second setting request including the first version information and the second version information is obtained and the first candidate information is received from the second communication device, the controller is configured to determine the second version as the target version and determine the second encryption scheme as the target encryption scheme, and in a case where the second setting request is obtained and the second candidate information is received from the second communication device, the controller is configured to determine the second version as the target version and determine the first encryption scheme as the target encryption scheme.

7. The first communication device as in claim 6, wherein the first communication device further supports a third version of the encrypted communication protocol, the third version being newer than the second version, the third version is incapable of using the first encryption scheme and the second encryption scheme and capable of using a third encryption scheme which is more secure than the second encryption scheme, in a case where a third setting request not including the first version information but including the second version information and third version information indicating the third version is obtained and the first candidate information not including the third version information is received from the second communication device, the controller is configured to determine the second version as the target version and determine the second encryption scheme as the target encryption scheme, in a case where the third setting request is obtained and the second candidate information not including the third version information is received from the second communication device, the first encryption scheme is not determined as the target encryption scheme, and in a case where the third setting request is obtained and third candidate information including the third version information and third scheme information indicating the third encryption scheme is received from the second communication device, the controller is configured to determine the third version as the target version and determine the third encryption scheme as the target encryption scheme.

8. The first communication device as in claim 6, wherein in a case where the second version is selected by a user on a first screen, the controller is configured to obtain the first setting request not including the first version information but including the second version information, in a case where the first version and the second version are selected by the user on the first screen, the controller is configured to obtain the second setting request which includes the first version information and the second version information, and an encryption key is not capable of being selected on the first screen.

9. The first communication device as in claim 8, wherein in a case where, on a second screen different from the first screen, the second version is selected by the user and M encryption schemes are selected by the user from among a plurality of encryption schemes that the second version is capable of using, the controller is configured to obtain a fourth setting request including the second version information and M scheme information indicating the M encryption schemes, the M being an integer equal to or greater than 1, and the plurality of encryption schemes including the first encryption scheme and the second encryption scheme, and in a case where the fourth setting request is obtained and the candidate information including the second version information and N scheme information indicating N encryption schemes, the controller is configured to determine the second version as the target version and determine one encryption scheme included in both the M encryption schemes and the N encryption schemes as the target encryption scheme, the N being an integer equal to or greater than 1.

10. The first communication device as in claim 6, wherein the encrypted communication protocol is a protocol according to Transport Layer Security (TLS).

11. A non-transitory computer-readable recording medium storing computer-readable instructions for a first communication device, wherein the first communication device supports a first version of an encrypted communication protocol and a second version of the encrypted communication protocol, the second version being newer than the first version, the first version is capable of using a first encryption scheme, the second version is capable of using the first encryption scheme and a second encryption scheme which is more secure than the first encryption scheme, and the computer-readable instructions, when executed by a processor of the first communication device, cause the first communication device to:

obtain a setting request related to the encrypted communication protocol;

after the setting request has been obtained, send setting information according to the setting request to a second communication device; and after the setting information has been sent to the second communication device, execute an encrypted communication with the second communication device by using a version and an encryption scheme that were determined by the second communication device based on the setting information, wherein in a case where a first setting request not including first version information indicating the first version but including second version information indicating the second version is obtained, first setting information is sent to the second communication device, the first setting information including the second version information and second scheme information indicating the second encryption scheme but not including first scheme information indicating the first encryption scheme, and in a case where a second setting request including the first version information and the second version information is obtained, second setting information is sent to the second communication device, the second setting information including the first version information, the second version information, the first scheme information, and the second scheme information.

12. A non-transitory computer-readable recording medium storing computer-readable instructions for a first communication device, wherein the first communication device supports a first version of an encrypted communication protocol and a second version of the encrypted communication protocol, the second version being newer than the first version, the first version is capable of using a first encryption scheme, the second version is capable of using the first encryption scheme and a second encryption scheme which is more secure than the first encryption scheme, and the computer-readable instructions, when executed by a processor of the first communication device, cause the first communication device to:

obtain a setting request related to the encrypted communication protocol;

after the setting request has been obtained, receive candidate information from a second communication device, the candidate information including version information indicating a version of the encrypted communication protocol which the second communication device is capable of using and scheme information indicating an encryption scheme which the second communication device is capable of using;

determine a target version and a target encryption scheme, the target version being a version of the encrypted communication protocol to be used in the encrypted communication with the second communication device, and the target encryption scheme being an encryption scheme to be used in the encrypted communication with the second communication device; and execute the encrypted communication with the second communication device by using the target version and the target encryption scheme, wherein in a case where a first setting request not including first version information indicating the first version but including second version information indicating the second version is obtained and first candidate information including the second version information and second scheme information indicating the second encryption scheme is received from the second communication device, the second version is determined as the target version and the second encryption scheme is determined as the target encryption scheme, in a case where the first setting request is obtained and second candidate information including the second version information and first scheme information indicating the first encryption scheme but not including the second scheme information is received from the second communication device, the first encryption scheme is not determined as the target encryption scheme, in a case where a second setting request including the first version information and the second version information is obtained and the first candidate information is received from the second communication device, the second version is determined as the target version and the second encryption scheme is determined as the target encryption scheme, and in a case where the second setting request is obtained and the second candidate information is received from the second communication device, the second version is determined as the target version and the first encryption scheme is determined as the target encryption scheme.

* * * * *